United States Patent [19]
Butler et al.

[11] Patent Number: 6,018,340
[45] Date of Patent: *Jan. 25, 2000

[54] ROBUST DISPLAY MANAGEMENT IN A MULTIPLE MONITOR ENVIRONMENT

[75] Inventors: Laura J. Butler, Seattle; Adam Smith, Redmond, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/786,969

[22] Filed: Jan. 27, 1997

[51] Int. Cl.$^7$ .................................................... G06F 3/14

[52] U.S. Cl. .................. 345/339; 345/340; 345/332; 345/342; 345/1; 345/145

[58] Field of Search ................................. 345/326, 332, 345/333, 334, 339, 340, 341, 342, 347, 145, 1

[56] References Cited

U.S. PATENT DOCUMENTS

| | | | |
|---|---|---|---|
| 5,107,251 | 4/1992 | Frank et al. | 340/709 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,463,726 | 10/1995 | Price | 345/345 |
| 5,564,002 | 10/1996 | Brown | 395/340 |
| 5,657,050 | 8/1997 | McCambridge | 345/145 |
| 5,742,285 | 4/1998 | Ueda | 345/339 |
| 5,835,090 | 11/1998 | Clark et al. | 345/339 |

OTHER PUBLICATIONS

Shirley, John and Rosenberry, Ward, "Microsoft RPC Programming Guide", O'Reilly & Associates, 1995.

Kramer, Matt, "Baranofs MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

Summary of "Multiple Monitor Support on Macintosh Computers".

Inside Macintosh, Apple Computer, Inc., published 1985.

Webster, Bruce F., "Just How Compatible is Compatible?", Macworld, Nov. 1987, vol. 4, No. 11, pp. 108–113.

Borrell, Jerry, "The Graphic Mac", Macworld, Nov. 1986, vol. 3, No. 11, pp. 100–105.

Ushijima, David, Chasing Rainbows, Macworld, Jul. 1987, Jul. 1987, vol. 7, No. 7, pp. 109–115.

Inside Macintosh, vol. V, Apple Computer, Inc., 1988.

Heid, Jim, "Working Smart", Macworld, Oct. 1995, pp. 145–146.

"A Mac of a Different Color", Macworld, Apr. 1987, vol. 4, No. 4, pp. 132–133.

Heid, Jim, "Approaching the Mac II", Macworld, Jun. 1987, vol. 4, No. 6, pp. 130–133.

FairNet, (Mac)System 7.5: Advanced, at Internet site: fnft@aurora.alaska.edu.

(List continued on next page.)

*Primary Examiner*—Raymond J. Bayerl
*Assistant Examiner*—Thomas T. Nguyen
*Attorney, Agent, or Firm*—Workman, Nydegger, Seeley

[57] ABSTRACT

A computer system includes an operating system with a graphical user interface (GUI), a user subsystem which together with the GUI provides for managing a plurality of applications, a graphical device interface for routing GUI information relating to the applications, such as a cursor or an application window, first and second device drivers for receiving GUI information routed from the graphical device interface and a forking display driver. The forking display driver is used for implementing a method which allocates the display of the graphical user information such as the cursor position or application window on only one monitor, where two or more monitors arc controlled by the operating system in a manner so as to define a virtual monitor space that is formed by the combined monitor space of each of the separate monitors.

26 Claims, 18 Drawing Sheets

OTHER PUBLICATIONS

"Multiple Monitor Display Boards", Appian Graphics, at Internet site: appiantech.com.

"Hydra Vision Press Release", Feb. 5, 1996, Appian Graphics, at Internet site: appiantech.com.

"Multiple Monitor Applications", Sep. 27, 1996, Appian Graphics, at Internet site: appiantech.com.

"Macintosh Computers Offer More Flexible Monitor Support", The Macintosh Advantage, Apple Computer, Sep. 27, 1996, at Internet site: product.info.ap . . . dvantages/monitor.html.

"Using Two Monitors", Sep. 27, 1996.

Poor, Alfred, "Double Vision: Appian's Impulse Graphics Card Gives Your Monitor a View–or Two", PC Magazine, May 14, 1996, Ziff–Davis Publishing Company 1996.

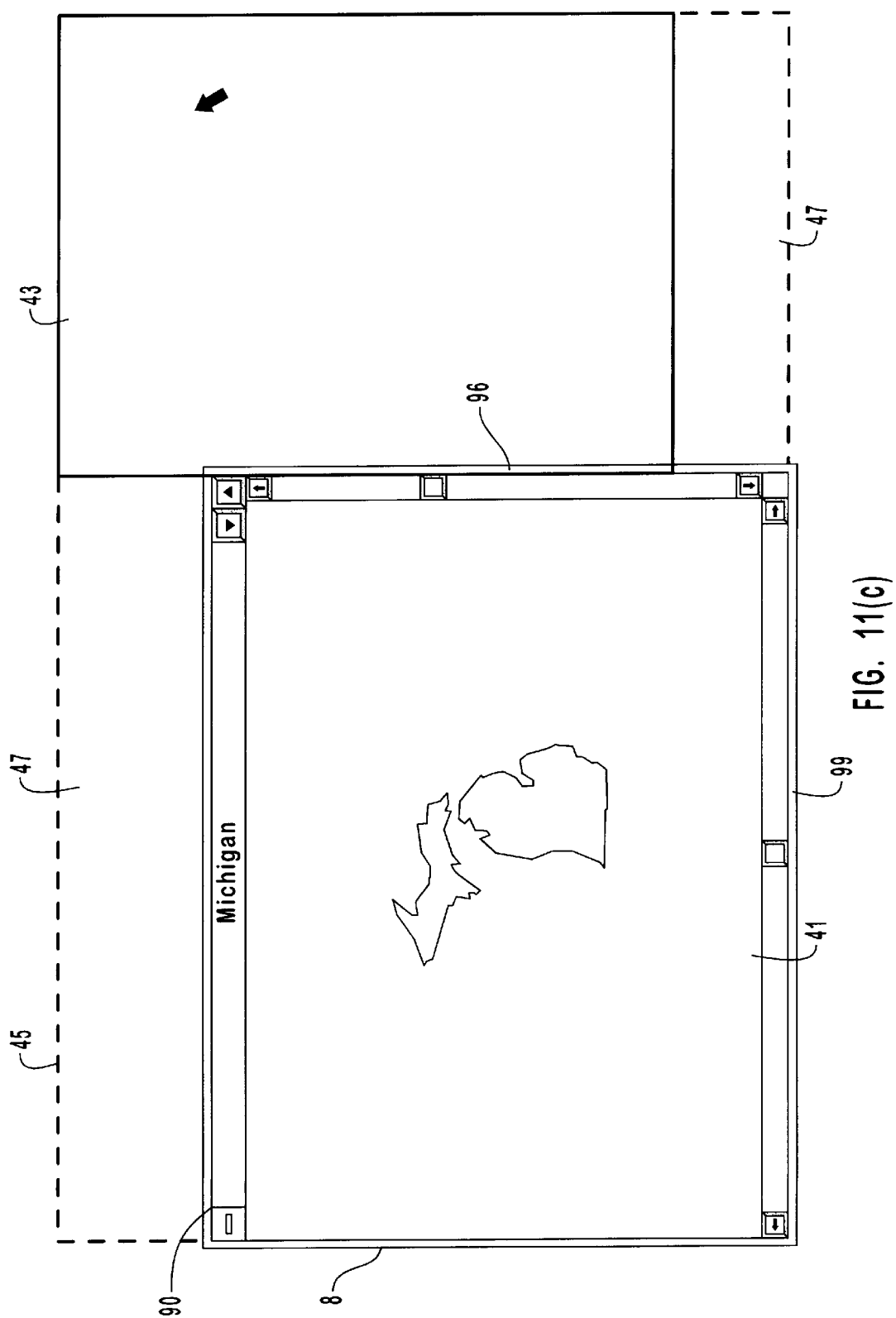

ROBUST DISPLAY MANAGEMENT IN A MULTIPLE MONITOR ENVIRONMENT

BACKGROUND

This invention relates to managing cursor and window displays in a multiple monitor environment.

A typical computer system as shown in FIG. 1 includes a computer 300 having a central processing unit 304, an input/output unit 306 and memory 302 containing various programs used by the computer 300 such as an operating system 303 and one or more application programs 305. An end-user of the computer system communicates with computer by means of various input devices (keyboard 320, mouse 310) which transfer information to the computer via input/output unit 306. The computer 300 replies to this input data, among other ways, by providing responsive output to the end-user, for example, by displaying appropriate text and images on the screen of a display monitor 330.

Operating systems often include a graphical user interface ("GUI") by which the operating system and any applications it may be running (e.g., a word-processing program) may communicate with an end-user. A commonly used GUI implementation employs a desktop metaphor in which the screen of the monitor is regarded as a virtual desktop. The desktop is an essentially two-dimensional working template area supporting various graphical objects, including one or more display regions. As shown in FIG. 2, information is displayed on the desktop 21 within display regions 23 (e.g., window, dialog box, pop-up menu, pull-down menu, drop-down list, icon), which typically are rectangular in shape. Each display region 23 may be dedicated to a specific application or to the operating system under which the applications are running. By manipulating a cursor 25 (such as with standard point & click and drag & drop techniques), an end-user can manage the display regions 23 as desired, for example, by creating new display regions or eliminating old ones, or by resizing or repositioning the display regions to fit the end-user's needs. The end-user may "activate" a particular display region and its associated application, for example, by "clicking" the cursor 25 when it appears within the desired region.

In a computer system using a single monitor 330 as shown in FIG. 1, a problem of screen clutter may occur when an end-user has a large number of display regions open on the monitor at the same time. Screen clutter tends to confuse the end-user and reduce his or her efficiency. Moreover, end-users of certain applications (desktop publishing, CAD/CAM/CAE, videoconferencing, etc.) typically will want to be able to view and use two large display regions (e.g., an editing window and an output window) at substantially the same time, but often the most useful sizes of the two windows are too large to fit side-by-side on a single monitor.

To alleviate this problem, a computer system such as that shown in FIG. 3 having two monitors 330 and 332 has been used. In the multiple monitor system of FIG. 3, the combination of the monitor spaces (two in the case shown—one monitor space 41 corresponding to monitor 330 and a second monitor space 43 corresponding to monitor 332) may be treated as a single, contiguous virtual desktop 45 as shown in FIG. 4. Through appropriate cursor manipulations, an end-user may move objects, such windows A, B, C, D and cursor 25, back and forth between the two monitor spaces 41 and 43 or may even position one of these objects (e.g., window C in FIG. 4) so that it spans the two monitor spaces.

SUMMARY

In one aspect of the invention, objects (e.g. a cursor image, a window or other display region) are displayed in one of multiple monitor spaces by comparing a position of the object with a position of each of the monitor spaces. A monitor space is chosen from among the multiple monitor spaces based on a result of the comparison, and the object is displayed in the chosen monitor space. If the object is a cursor image, for example, the comparison may be based on a squared distance between the position of the cursor and the positions of each of the monitor spaces. The cursor image may be displayed in the monitor space (for example, at a point on the edge of the monitor space) that has the smallest squared distance between it and the cursor.

Alternatively, the comparison may be accomplished by establishing a bounding rectangle for the monitor spaces by determining their union, and then comparing the position of the cursor with a position of the bounding rectangle. The cursor's position is moved to a point within the bounding rectangle if the comparing determines that the cursor was at a position outside of the bounding rectangle. The cursor image may be displayed in the monitor space that has a closest Euclidean distance—the length of a hypothetical line drawn from the cursor to the monitor space such that the line is perpendicular to the edge of the monitor space —between the monitor space and the cursor.

If the object is a window or other display region (e.g., dialog box, pop-up menu, pull-down menu), the comparison may be based on an area of overlap between the display region and each of the available monitor spaces. In that case, the monitor space that has a largest area of overlap with the display region is chosen for display. If no monitor space has an area of overlap with the display region, then the primary display, determined at the start up of the computer system, may be chosen. Alternatively, the monitor space containing the largest portion of surface area of the currently active window may be chosen. Once chosen, the window or other display region is moved so that it appears entirely within the chosen monitor space.

Positioning of display regions may be used to decide in which monitor space a minimized window should be maximized in response to input from the end-user. In that case, the position of a prior non-minimized state of the window is used in the overlap comparison, and the window may be maximized in the monitor space that contains the largest area of overlap with the window under consideration when it was in its prior non-minimized state.

In another aspect of the invention, a cursor image is displayed in one of multiple available monitor spaces upon an event being generated in response to movement of an input device, for example, a mouse. While the event is pending, a new position for the cursor image is determined based on an old position of the cursor image and the movement of the input device. If the new position of the cursor image is on a different one of the monitor spaces than the old cursor image, then the cursor image is displayed at its new position if a process running in the computer is not relying on the old position of the cursor image. Otherwise, an operation is placed in a queue to display the cursor image at its new position after the event has lapsed. Subsequently, the cursor image is displayed at its new position based on a queue of pending cursor image moves. In any event, all pending cursor image moves are performed before the applications are notified of the moves.

In another aspect of the invention, a computer having a display engine displays a window across multiple monitor spaces by determining that a display window that appears entirely within a first monitor space is to be moved or resized so that a first portion of the display window remains in the first monitor space and a second portion of the display window appears in a second monitor space. The first portion of the display window is displayed in the first monitor space by performing a bit block transfer operation, and the second portion of the display window in the second monitor space by passing the second portion of the display window through the display engine. If, however, the second monitor space has substantially the same color characteristics as the first monitor, both portions of the display window are displayed by performing a bit block transfer operation.

Advantages of this invention may include one or more of the following. The techniques described here provide an end-user with a GUI that behaves and responds in a predictable and useful manner even if the GUI spans multiple monitor spaces. The cursor image always remains visible on exactly one monitor in a position that the end-user would most likely expect in response to the mouse being moved.

Display windows are positioned within a single monitor space so that the end-user can readily view and read the information displayed therein. Where appropriate, several Windows® operations (e.g., switching window, Print Screen, maximization, etc.) are directed towards a single predictable monitor space. In most cases, this monitor will be the one that is most likely for the end-user to presently be viewing. Windows are maximized onto a single monitor space in a manner that their edges do not spill over into an adjacent monitor space. The end-user is prevented from being able to reposition a window such that its titlebar is entirely off-screen and thus inaccessible.

Because of the manner in which the cursor and display windows (and other display regions) are handled in a multiple monitor environment, the composite desktop need not itself be rectangular. Rather, the individual monitor spaces that make up the desktop may be positioned adjacent to one another in a manner that results in an irregularly shaped (i.e., non-rectangular) composite desktop.

Windows that are moved to span monitor boundaries are re-drawn in an intelligent and efficient manner. The portion of the window that remains in the same monitor space is redrawn by moving a block of bits from one portion to another of the frame buffer for that monitor. Only the portion of the window that appears on a different monitor is "repainted" from scratch. This reduces the number of necessary pixel calculations while maintaining the color characteristics of the various monitors being used.

Other advantages and features will become apparent from the following description, including the drawings and claims.

The methods and mechanisms described here are not limited to any particular operating system or hardware configuration, but rather they may find applicability in any computing or processing environment that uses multiple output devices.

The techniques described here may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and two or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

BRIEF DESCRIPTION OF THE DRAWINGS

FIGS. 11(a), 11(b) and 11(c) are example screen displays of maximizing a window in a multiple monitors environment.

DETAILED DESCRIPTION

Operating in a multiple monitor environment creates several complexities and problems that are not present in a single monitor environment. In particular, the manner in which graphical objects should be handled and displayed in a GUI in response to end-user input (or application program requirements) varies considerably between the single monitor and multiple monitor environments. If single monitor solutions were applied in a multiple monitor environment, application programs would appear to the end-user to behave incorrectly or strangely and the end-user frequently would be confused and frustrated by his interaction with the GUI. To appreciate the differences in how objects should be managed by a GUI when changing from a single monitor to a multiple monitor environment, it is helpful to have a basic understanding of their respective display architectures.

Figure 1:
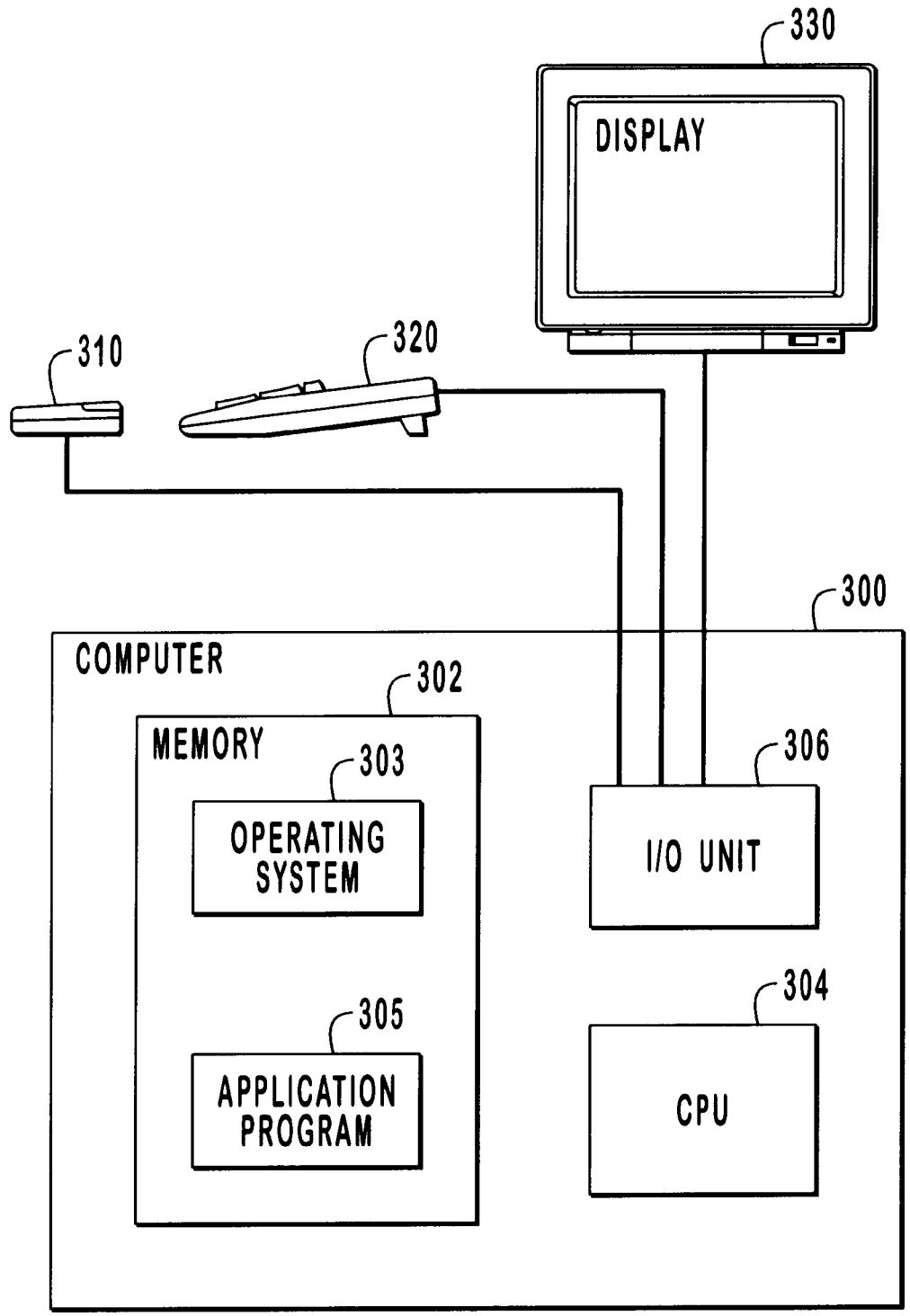
FIG. 1 is a block diagram of a computer system having a single display monitor.
Figure 2:
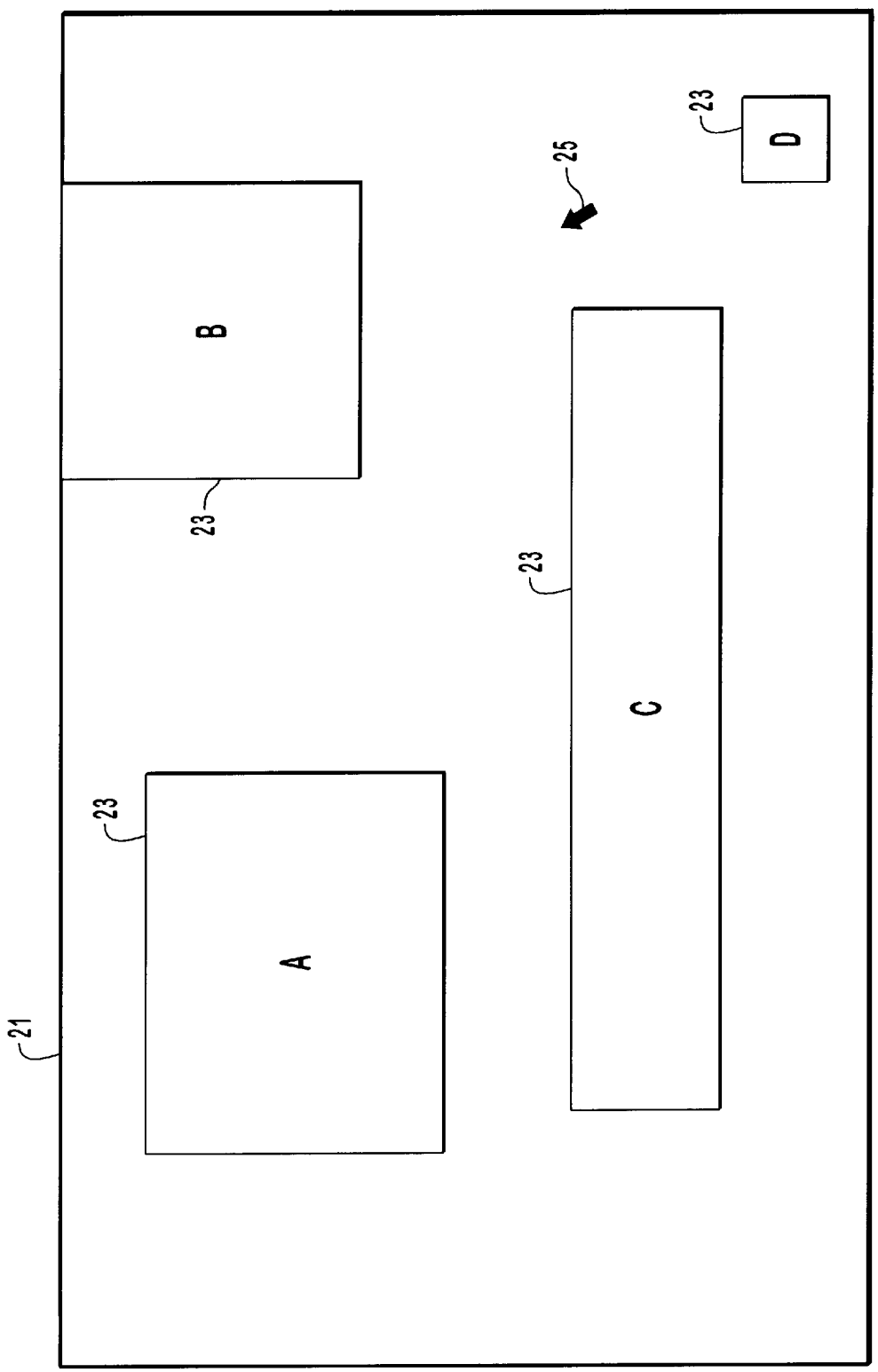
FIG. 2 is a diagram showing display regions in a graphical user interface as used in the computer system of FIG. 1.
Figure 3:
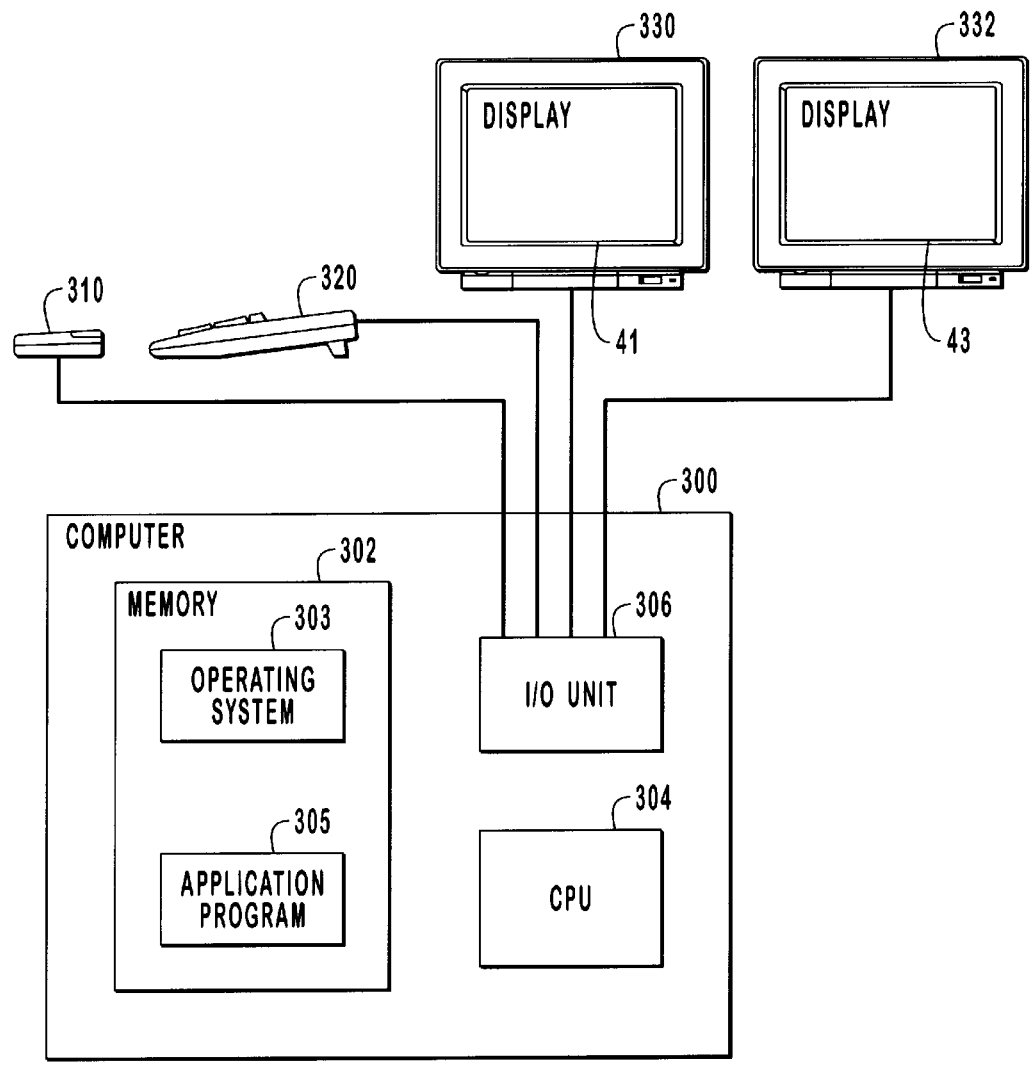
FIG. 3 is a block diagram of a computer system having multiple display monitors.
Figure 4:
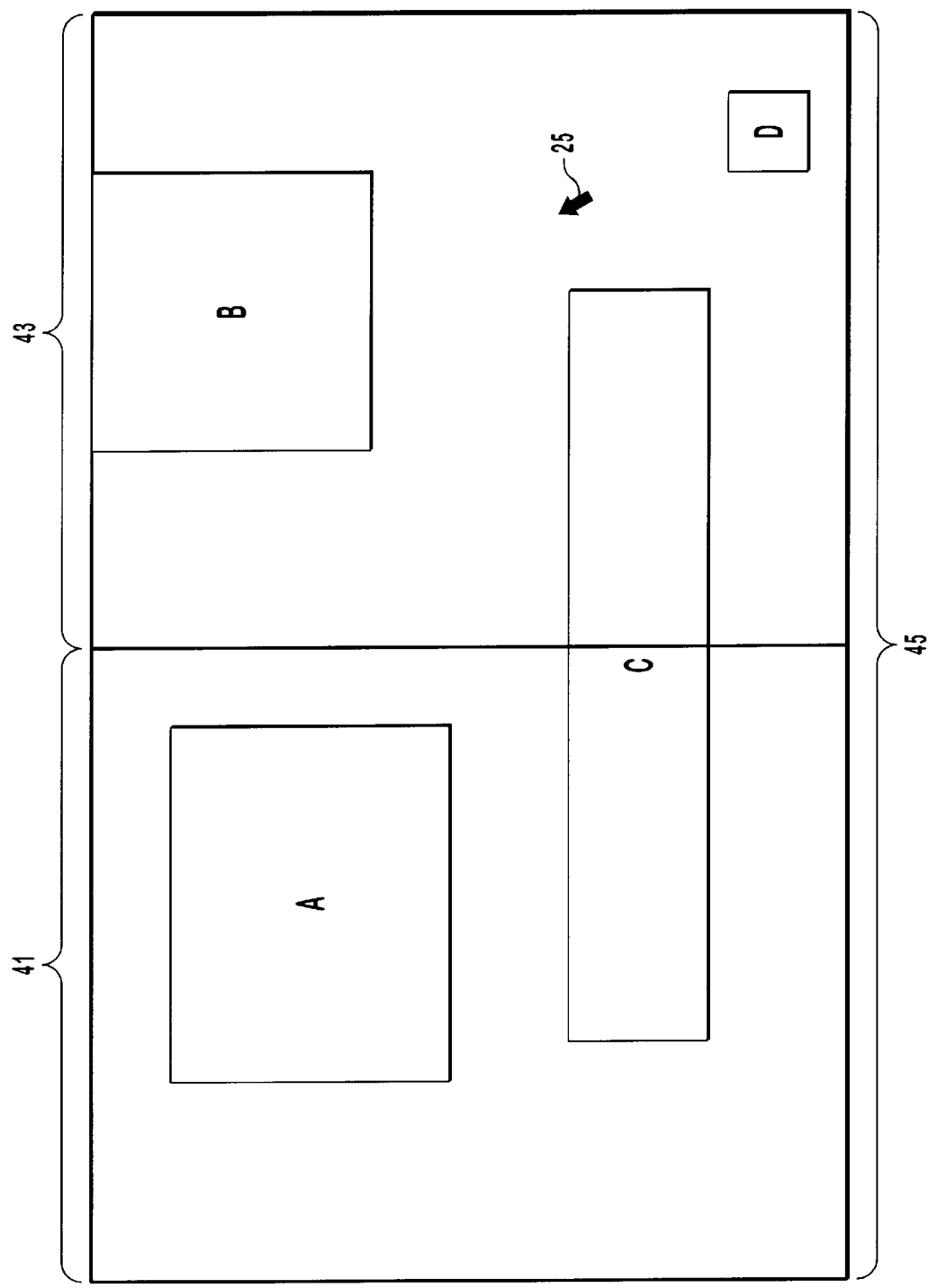
FIG. 4 is a diagram showing display regions in a graphical user interface as used in the computer system of FIG. 3.
Figure 5:
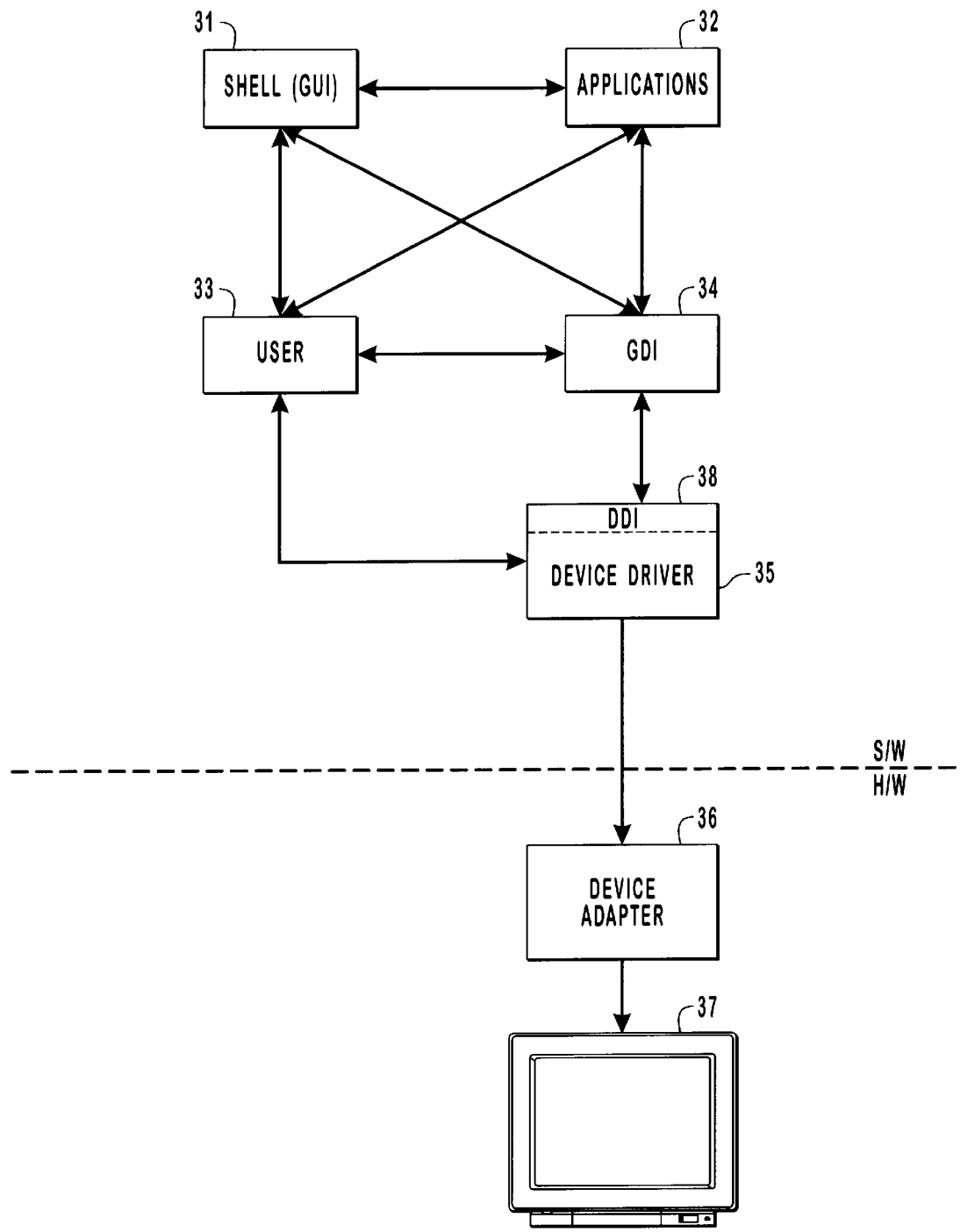
FIG. 5 is a single monitor display architecture block diagram for the computer of FIG. 1.

One operating system that uses a GUI is the Microsoft® Windows®95 operating system, which is described in the Microsoft® Development Library (July 1996), incorporated herein by reference. FIG. 5 is an abstract representation of a display architecture that may be used in Windows®95 for the single monitor computer system of FIG. 1. As shown in FIG. 5, an end-user uses a presentation shell (e.g. a GUI) to communicate with the operating system and one or more application programs 32. An application running on the computer system may display information in one or more of the display regions through a graphical device interface subsystem 34 ("GDI") provided by the operating system. GDI serves as a link between the application program and a graphics device, such as a video display adapter 36 (e.g., a plug-in card) included with the computer to provide graphics output signals to the computer monitor 37.

GDI lies logically between the application program 32 and a graphics device driver 35, which is a computer program designed to control a particular graphics hardware device such as the video display adapter. The device driver is not technically part of the operating system. Rather, the driver is a software module supplementing the operating system for updating the status of the video display adapter and the monitor in response to calls made to functions of the operating system in general and to functions of GDI in particular.

Communication between the GDI and the device driver is facilitated by a device driver interface 38 ("DDI"). DDI 38 is a set of functions provided by the device driver for access by GDI 34. Information is passed between GDI and the device driver through input and output parameters of the DDI functions. A GDI call to the "DrvEnableDriver( )" function initializes the device driver and passes back to GDI a function list of driver-supported DDI functions. GDI itself handles any operations not represented in the function list received. For example, if the device driver lacks an optional function "DrvLineTo( )" for drawing a single solid cosmetic line, GDI handles drawing the line without calling DrvLineTo( ).

Some DDI functions are necessary for communication between GDI and DDI, while others are optional. Necessary DDI functions include, for example, "DrvGetModes( )" for listing video modes supported by the adapter and "DrvAssertMode( )" for resetting the video mode. Depending on how a device driver is implemented, other functions may or may not be necessary. For example, a display driver typically is not required to handle fonts unless the device adapter involved has one or more resident fonts (i.e., fonts defined by the adapter, not by the operating system). If the adapter has a resident font, the device driver must supply information to GDI about the font.

In response to application program originated function calls routed through GDI, the device driver must ensure that the video display adapter produces the required output. I.e., in response to a request from an application, if GDI determines that a function relating to the request is supported by the device driver, GDI calls the function. It is the responsibility of the device driver to execute the function properly and return control to GDI upon completion of processing instructions associated with the function.

Typically, in response to calls to its DDI, the device driver updates the status of the video display adapter by changing the contents of memory and registers used by the adapter. The memory used by the adapter is referred to as "screen memory" or the "frame buffer." What appears on the monitor's screen is controlled directly by the adapter and corresponds to the contents of the screen memory and the registers. The device driver also typically performs additional functions such as monochrome-to-color conversion of bitmaps, drawing of repetitive patterns in screen memory, and moving of an image from one portion of screen memory to another (referred to as a "bit block transfer" or "BitBlt"). Often, the operating system cannot perform these additional functions as quickly because, unlike the device driver, the operating system is not adapted to take advantage of the video display adapter's particular characteristics and capabilities.

The display windows appearing on the screen are contained within a logical space corresponding to the desktop. The screen of the monitor may show only a portion of the desktop at any given time. The operating system allows applications running on the computer to specify desktop object characteristics such as colors, font sizes, output resolutions and the like without regard for the specific limitations of a particular video display adapter or monitor. GDI converts the application's specified characteristics to conform to the adapter's and monitor's limitations. For example, the application may specify a yellow color, but the adapter and monitor combination may be capable of displaying gray scales only. If so, GDI converts the yellow color to a gray scale.

When the operating system is started the video display adapter is initialized by another operating system subsystem "USER" 33. USER provides functions relating to the GUI, including functions to create, move, size, and remove screen objects such as display windows, selection menus appearing in the display windows, graphical icons, and the like. For example, an application program can call a USER function to remove a display window associated with the application program. USER also controls other resources such as a sound driver, a timer, and communications ports. In addition, end-user input from a mouse, a keyboard, or other input device is directed by USER to an application program.

In some of the Windows® operating system products (e.g., Windows®95), USER is able to interact directly with the adapter's device driver. In that case, USER requires the device driver to provide cursor support directly, i.e., it requires the device driver to make directly available some functions relating to displaying a mouse pointer (cursor). These functions include "CheckCursor( )" for drawing the cursor if drawing is not disabled, "InquireCursor( )" for retrieving information about the cursor, "MoveCursor( )" for moving the cursor to a specified position on the screen, and "SetCursor( )" for setting the cursor's shape. In other Windows® operating system products (e.g., Windows® NT), USER does not communicate directly with the adapter's device driver but rather communicates with NT's equivalent of GDI (referred to as "GRE" for "graphics engine"), which in turn communicates with the device driver.

When the Windows® 95 operating system first starts (at "boot-time"), USER calls the InquireCursor( ) function to retrieve information about the cursor. USER then sets a system timer to call the CheckCursor( ) function on each timer interrupt (i.e., at predetermined intervals) and starts a mouse-related device driver. As a result, whenever it is moved by the end-user, the mouse generates an event (e.g., a hard, asynchronous interrupt) causing the operating system to call MoveCursor( ) to re-display the cursor image at the screen location designated by the end-user. USER and application programs subsequently set the shape of the cursor using SetCursor( ). In this example, because USER calls MoveCursor( ) at the occurrence of each mouse move event, MoveCursor( ) sets a flag with a non-interruptable instruction (e.g., "bts") to prevent the MoveCursor( ) function from being called again before completing processing of a current call. Once the flag is set, MoveCursor( ) determines a new position (i.e., the x and y coordinates) and draws the cursor in the new position. When finished, MoveCursor( ) clears the flag with another non-interruptable instruction. Meanwhile, the CheckCursor( ) function is called at each timer interrupt to determine whether the cursor should be redrawn and whether drawing is enabled. If so, the function redraws the cursor.

Windows® NT does not use interrupts for performing cursor display and management functions but rather uses synchronous procedure calls ("APCs")—an alternative mechanism for handling events. An APC is a function that executes asynchronously in the context of a particular thread. Whenever the mouse is moved or otherwise manipulated by the end-user, an APC is queued for a thread dedicated to input handling. When this thread next runs, it executes the functions specified by the APCs in its queue. The dedicated input thread runs concurrently with any active applications and performs essentially the same functions for managing the cursor as described above with respect to the interrupt-based event handling mechanism.

Figure 6:
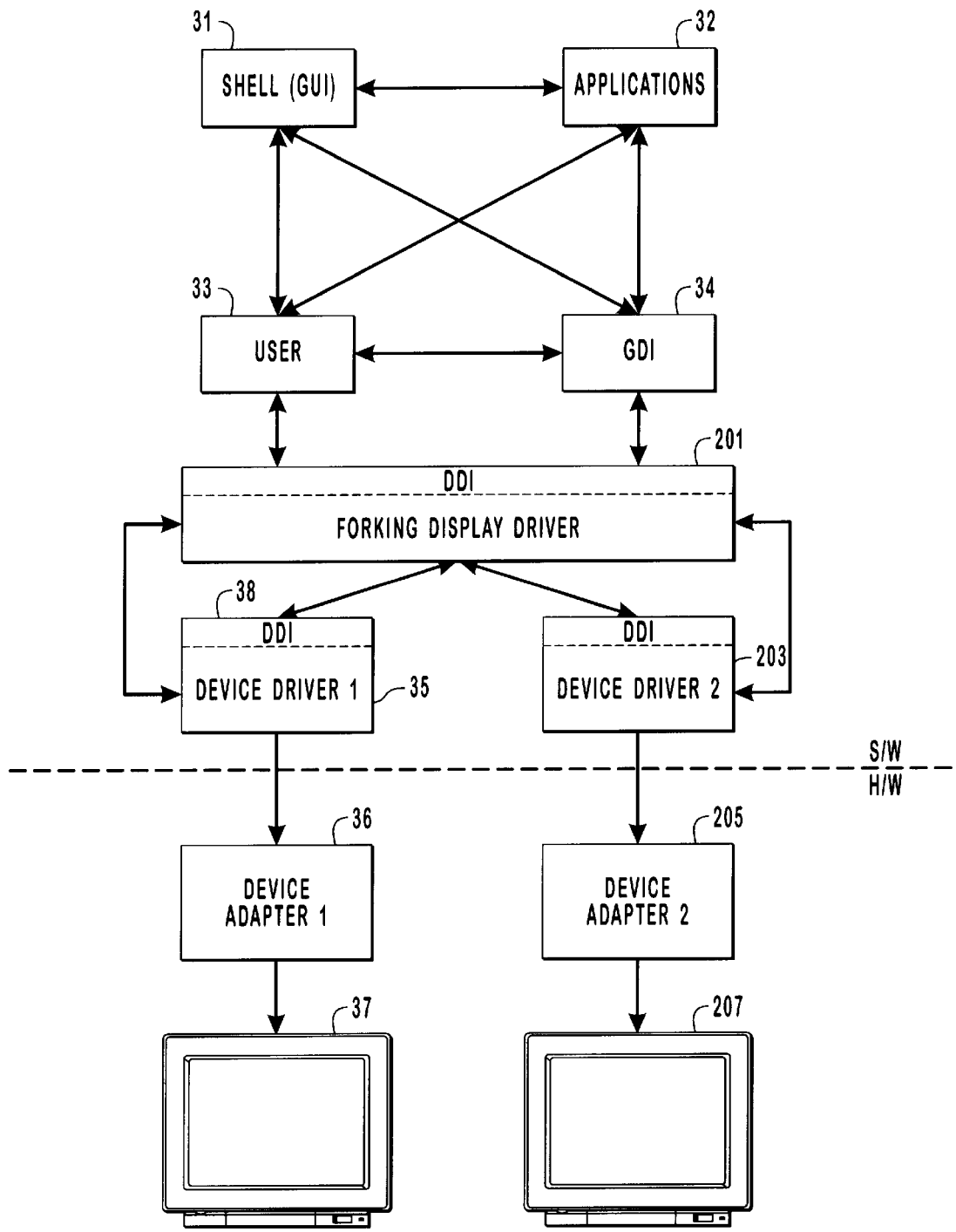
FIG. 6 is a multiple monitor display architecture block diagram for the computer of FIG. 3.

FIG. 6 illustrates a multiple monitor display architecture used in one embodiment which includes two device drivers 35, 203 and two monitors 37, 207. The multiple monitor architecture is similar to the single monitor display architecture except that it also includes a Forking Display Driver 201—a piece of software code that may be dynamically inserted or removed when a second monitor is installed or removed accordingly. The forking display driver effectively splits the graphics stream from the GDI into a number of parts equal to the number of monitors being used (e.g., two parts for two monitors) and thus distributes the virtual desktop across multiple monitors. Details on the forking driver may be found in commonly-assigned U.S. Ser. No. 08/786,971, entitled "ALLOCATING DISPLAY INFORMATION," which was filed concurrently with this application and is incorporated by reference.

As noted above, the USER code is responsible for, among other things, the manner in which various objects (e.g., windows, menus, dialog boxes, the cursor and the like) are displayed to the end-user. When the end-user enters input via the mouse or keyboard that is intended to affect the display (e.g., cursor movement, window repositioning or resizing), it is USER's job to respond to that input by changing the display in a robust manner—i.e., in a manner that accurately reflects the end-user's intentions and which does not surprise, confuse or frustrate the end-user in interacting with the GUI. Performing this task in a multiple monitor environment poses several challenges that were not present in the single monitor environment.

Accordingly, in one embodiment, USER manages in a robust manner objects within a GUI that spans two or more monitors. USER accomplishes this robust management through program code specifically designed for the multiple monitor environment. The specialized program code can be logically divided into two broad categories: (1) program code that places objects (e.g., dialog boxes, maximized windows, menu pop-ups) on one of the available monitors rather than displaying them across several monitors; and (2) program code that relocates objects (e.g., cursor, windows) so that they are not lost in display gaps that arise when the monitors are arranged to form an irregularly shaped (i.e., non-rectangular) composite desktop.

Figure 7:
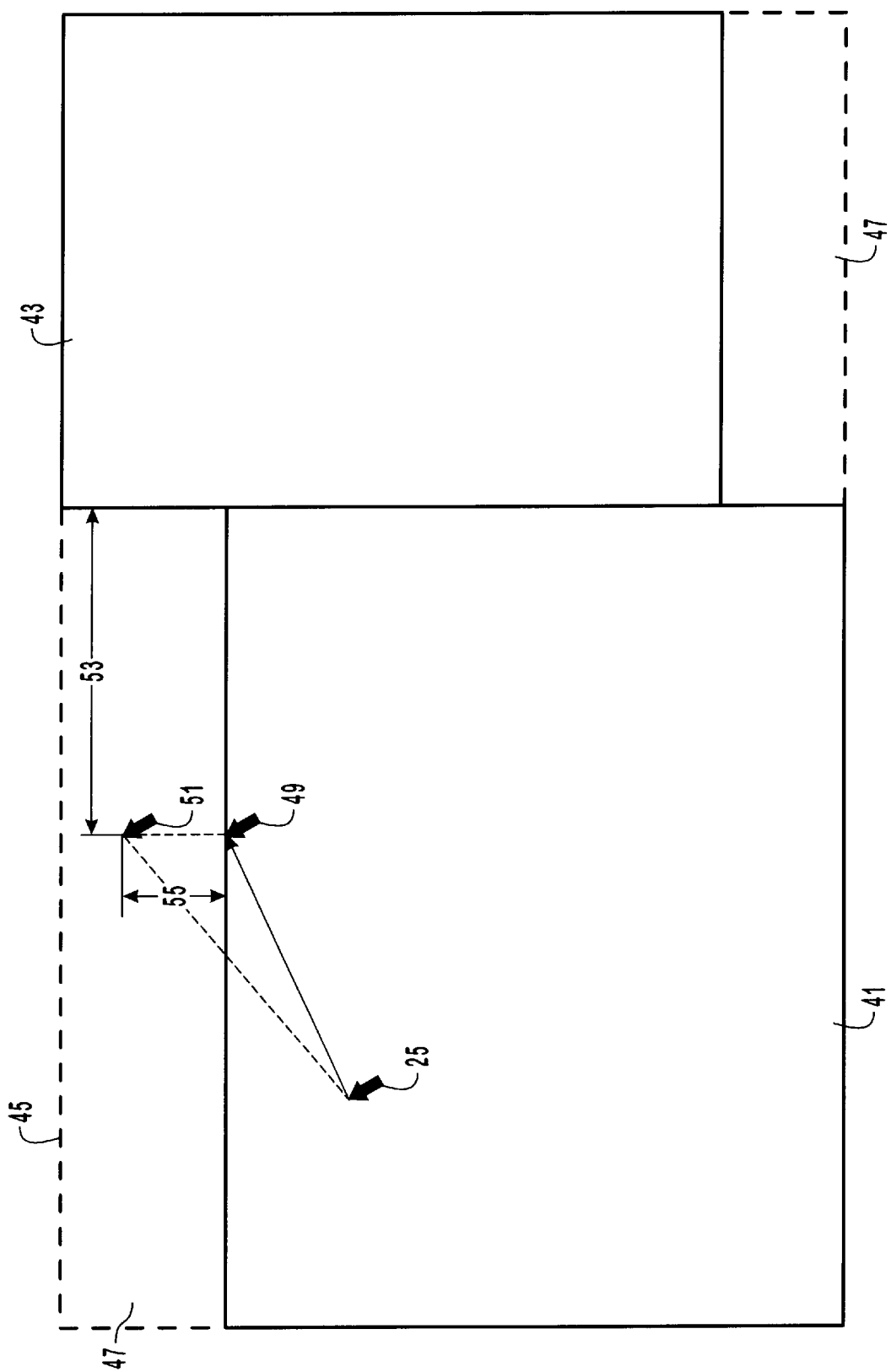
FIG. 7 is a diagram of the virtual desktop with an example of moving a cursor between two adjacent monitor spaces in a multiple monitor environment.

In FIG. 7, two monitors have been installed and are being used by the computer system so that the virtual desktop 45 spans monitor spaces 41 and 43. Desktop 45 corresponds to the union of monitor space 41 and monitor space 43. In this example, monitor space 41 and monitor space 43 are different sizes. The end-user has arranged the two monitor spaces in logical space (using a GUI utility provided by the operating system) arbitrarily such that they contact each other along one edge but do not share a common top or bottom line. Techniques for arranging multiple monitor spaces in logical space such that they form a contiguous, non-overlapping virtual desktop are discussed in commonly-assigned U.S. Ser. No. 08/786,972, entitled "LOGICAL MONITOR CONFIGURATION IN A MULTIPLE MONITOR ENVIRONMENT," which was filed concurrently with this application and is incorporated by reference. As a result of the end-user's placement of the monitors in logical space, the virtual desktop 45 has two "null" regions 47 that do not correspond to, or appear in, either of monitor spaces 41 or 43.

To ensure robust interaction with the end-user, USER must manage the desktop display so that objects are not "lost" (become entirely invisible to the end-user) in one of the null regions 47. At the same time, USER must ensure that a single object is not displayed redundantly such that identical information incorrectly appears in more than one monitor space. One such object that USER must manage in this manner is the cursor display.

In the single monitor case, managing the cursor display is relatively straightforward. When an end-user moves or otherwise manipulates the mouse, an event is generated and is sent, along with data descriptive of the mouse's manipulation, to the operating system to notify it that the end-user is, for example, requesting movement of the cursor on the screen display. In response, the USER code invokes MoveCursor( ) to determine where (in X and Y coordinates) the cursor should end up on the screen based on the cursor's present position, the mouse manipulation data generated in connection with the event and any special mouse settings (e.g., cursor acceleration feature) that the end-user may have selected. The new position for the cursor image is communicated to the single monitor's display driver, which has remembered the cursor's current position. Upon receiving data representative of the cursor's new position from USER, the display driver "undraws" (i.e., repaints or restores the background image presently covered by the cursor image) the cursor's current position and draws the cursor's new position as determined by MoveCursor( ).

Complications arise in the above approach when the cursor is to be displayed on a desktop that spans multiple monitor spaces. In that case, at least two monitors form the virtual desktop and the cursor must move seamlessly between these monitor spaces in response to mouse input from the end-user. By definition, any two adjacent monitor spaces must share a common edge but cannot overlap. The cursor accordingly may be displayed only in one of monitor spaces at any given time. As long as the end-user's mouse input corresponds to cursor movement that remains within a single display, the single monitor approach may be used with correct results. If, however, the end-user manipulates the mouse to indicate movement of the cursor from one monitor space to another, or to a null region, special cursor display management techniques must be employed.

In FIG. 7, assume that the cursor appears at position 25 at time T(0) and that the end-user moves the mouse in such a manner that the cursor would, in a single display environment (i.e., if desktop 45 was co-extensive with a single monitor's space), appear at position 51 at time T(1). In the multiple monitor environment of FIG. 7, however, position 51 is within a null region 47. The cursor accordingly cannot be displayed by USER at position 51 because it does not fall within any monitor space and thus would be invisible to the end-user. Instead, USER selects one of the multiple monitor's spaces for display of the cursor by determining which of the monitor spaces is closest to the cursor. This determination is based on the length in device coordinates of a logical perpendicular line between the cursor's "hotspot" (a single point at the arrow's tip for the cursor shown in FIG. 7) and the closest edge of each monitor space under consideration.

Once USER has selected one of the multiple monitors on which the cursor is to be displayed, USER displays the cursor image on that monitor by communicating the cursor's position to the display driver associated with the chosen monitor. At essentially the same time, USER instructs the display driver for each of the unchosen monitors, each of which has its own independent cursor, to turn off its cursor display.

In FIG. 7, position 51 is a distance 53 from monitor space 43 and a distance 55 from monitor space 41. Because distance 55 is shorter than distance 53, USER displays the cursor in monitor space 41 so that the cursor's hotspot appears at position 49—a point directly below point 51 on the edge of monitor space 41. In this sense, monitor space 41 is said to "own" the cursor. Cursor ownership is maintained by a dedicated variable in USER and is used, for example, to identify which monitor's display driver USER should communicate with when the cursor display must be moved or otherwise modified (e.g., change the cursor image from an arrow to an hour glass using the SetCursor( ) function).

Figure 8:
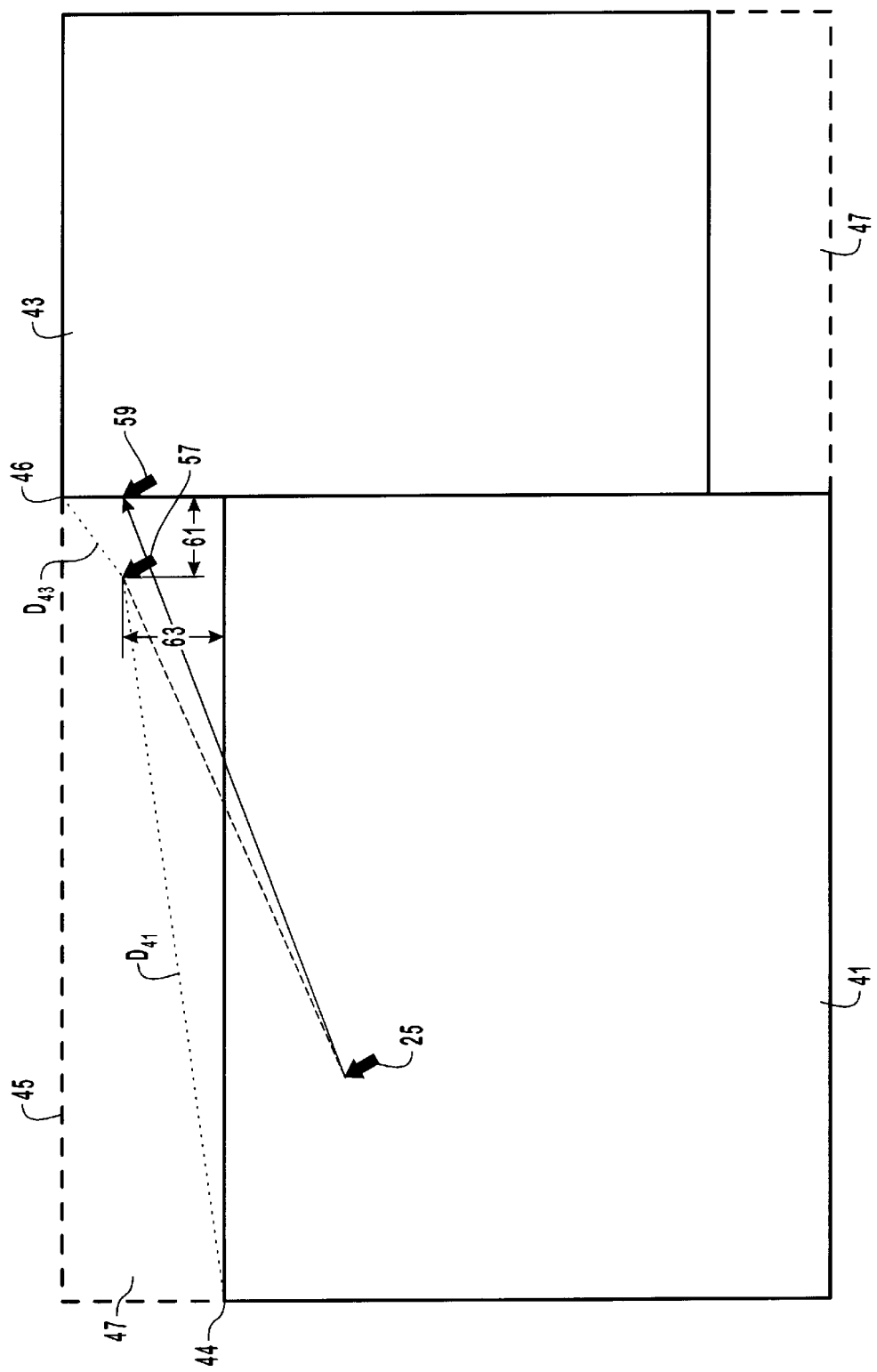
FIG. 8 is a diagram of the virtual desktop with an example of moving a cursor between two adjacent monitor spaces in a multiple monitor environment.

In the example shown in FIG. 8, the end-user has manipulated the mouse such that a cursor starting at position 25 at time T(0) would end up at position 57 at time T(1) if desktop 45 was coextensive with a single monitor space. Because position 57 falls within null region 47, however, the cursor is instead displayed at time T(1) at position 59 in monitor space 43. Monitor space 43 was determined to be the "owner" of the cursor, and thus the proper space in which to display the cursor, because monitor space 43 is closer than monitor space 41 to position 57—i.e., the perpendicular horizontal distance 61 between position 57 and the edge of monitor space 43 is shorter than the perpendicular vertical distance 63 between position 57 and the edge of monitor space 41.

Figure 9:
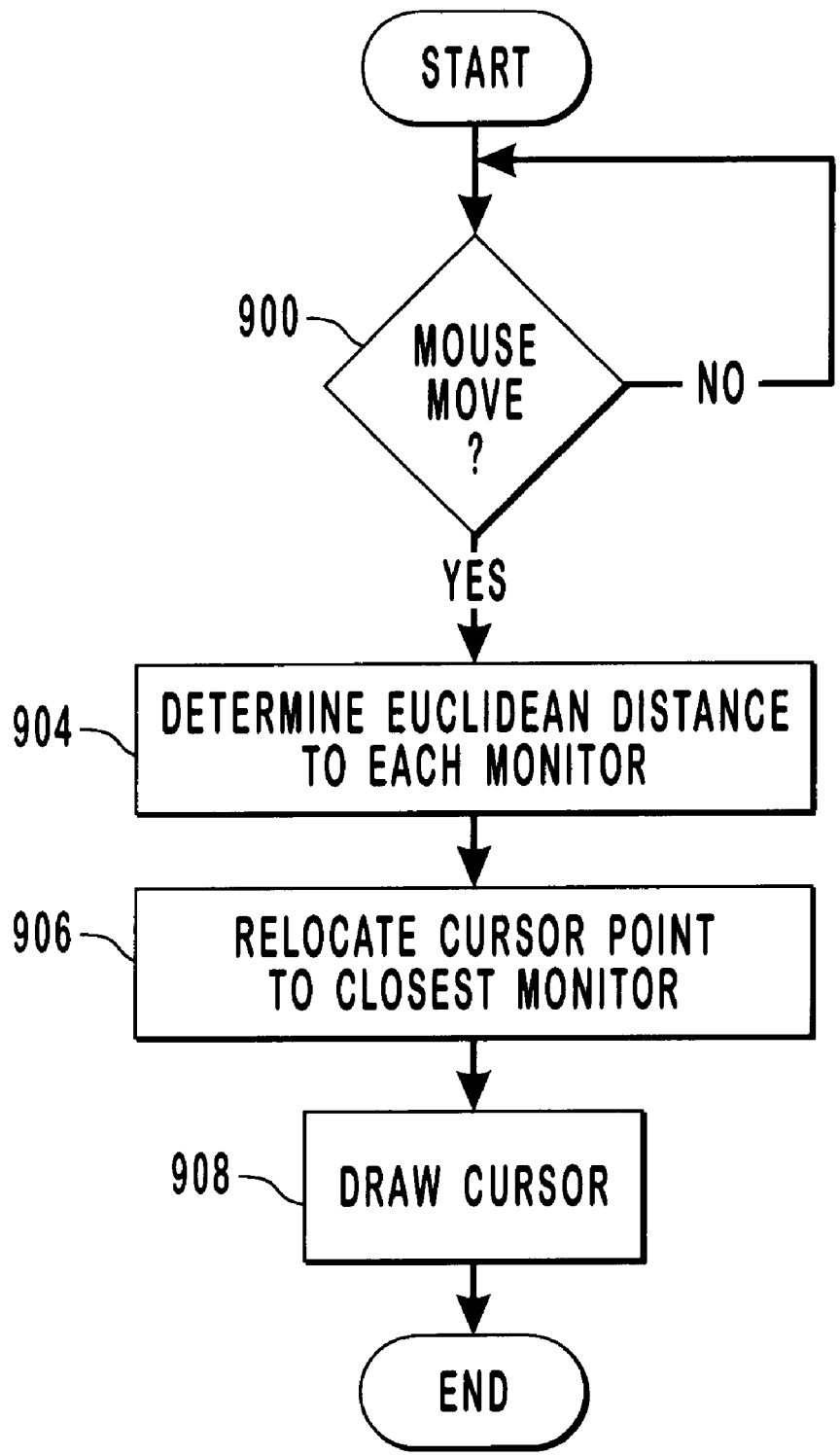
FIG. 9 is a flowchart for determining where to place a cursor when moving it between adjacent monitor spaces in a multiple monitor environment.

The process by which MoveCursor( ) performs the above-described trans-monitor cursor moves is described in connection with the flowchart of FIG. 9. At step 900, MoveCursor( ) waits until a mouse move event has occurred, thereby indicating movement of the mouse by the end-user. A mouse move event causes USER to suspend execution of all current applications and to transfer the locus of execution to a mouse move interrupt routine.

When the end-user moves the mouse to a new location, the corresponding raw destination point of the cursor (e.g., point 57 in FIG. 8) is somewhere in logical space that does not necessarily fall within a monitor space. Accordingly, MoveCursor( ) must display the cursor so that it always appears on exactly one monitor regardless of where the mouse has been moved.

At step 904, MoveCursor( ) determines which monitor is closest in Euclidean (perpendicular) distance to the clipped point by using the Pythagorean theorem ($D^2=X^2+Y^2$). First, the (X,Y) coordinates of the origin 44 of monitor space 41 are subtracted from the (X,Y) coordinates of position 57. The resulting X and Y values are squared and then added together to determine $D_{41}^2$—the square of the distance from position 57 to the origin 44 of monitor space 41. Corresponding calculations are performed with respect to monitor space 43 to determine $D_{43}^2$—the square of the distance from position 57 to the origin 46 of monitor space 43. Even though they are the squares of the distances to their respective monitors, the smaller of these two values ($D_{41}^2$ or $D_{43}^2$) nevertheless represents the closer monitor. As a result, taking the square root of the two values ($D_{41}^2$ and $D_{43}^2$) to find the actual distances is unnecessary in determining which monitor space is closer.

These simplified calculations result in considerable processor time savings because no floating-point math is required. In FIG. 8, because $D_{43}^2$ is smaller than $D_{41}^2$ it means that the Euclidean distance 61 from position 57 to monitor space 43 is shorter than the Euclidean distance 63 from position 57 to monitor space 41.

An alternative way to determine the Euclidean distance from the raw cursor destination point to each of the monitors may be used. The first step in this alternative method is to "clip" the raw cursor destination point so that it falls within a logical bounding rectangle just large enough to encompass both monitor spaces 41 and 43. This clipping may be accomplished by the following code segment which changes the coordinate values of the raw destination point so that they do not exceed the maximum X and Y coordinates that define the bounding rectangle:

if (raw_point.x<screen.left) raw_point.x=screen.left;
    else if (raw_point.x>screen.right) raw_point.x= screen.right;
else
if (raw_point.y<screen.top) raw_point.y=screen.top;
    else if (raw_point.y>screen.bottom) raw_point.y= screen.bottom;

Once the raw destination point has been in clipped in the above manner it is assured to have (i) a Y coordinate within the range of Y coordinates occupied by one monitor space (e.g., monitor space 43); and (ii) an X coordinate within the range of X coordinates occupied by another monitor space (e.g., monitor space 41). Accordingly, under the alternative method MoveCursor( ) may calculate the respective distances from the clipped point to each of the monitor spaces using only subtraction operations. In FIG. 8, for example, distance 61 equals X coordinate of left edge of monitor space 43 minus X coordinate of position 57; distance 63 equals Y coordinate of top edge of monitor space 41 minus Y coordinate of position 57. The alternative method avoids floating point operations and thus provides a performance advantage similar to the method described above with respect to step 904.

Once the Euclidean distance to each of the monitors has been determined, at step 906 Movecursor( ) picks the monitor having shortest distance to the clipped point and moves the cursor to a location on the edge (or just inside) that monitor space. At step 908, USER then instructs the display driver which had the cursor image at its former position to clear it and instructs the display driver now having the cursor image to draw it at the proper location. All of steps 900–908 in FIG. 9—i.e., from the time the mouse is moved to the time the cursor is redrawn at its new position—occur during a single mouse move event sequence.

As noted above, USER maintains a variable that indicates which monitor in a multiple monitor environment currently owns the cursor. Exactly one monitor can own the cursor at any given time. Accordingly, the cursor owner variable is updated, if necessary, each time MoveCursor( ) is invoked by a mouse move event sequence. However, complications may arise because USER or some other process may be using the cursor owner variable for another purpose thus rendering it unavailable for updating during a mouse move event sequence. If the cursor owner variable is not updated when the cursor has in fact moved to a different monitor, subsequent USER functions could cause the cursor to appear on the incorrect display, or on both displays. USER solves this problem through a semaphore approach.

A semaphore is a programming technique for enforcing mutual exclusion. Ordinarily, a semaphore is implemented by disallowing a process from changing a variable until it has been released by another process that is currently using it. In Windows®, a strict semaphore lock on the cursor owner variable would cause the mouse move event sequence to wait for the semaphore lock to be released before updating the cursor owner variable. However, because the mouse move event sequence must complete before any other processes will continue, the process using the cursor owner variable cannot release the semaphore lock during the event sequence. As a result, the operating system would appear to "freeze" to the end-user.

Figure 10:
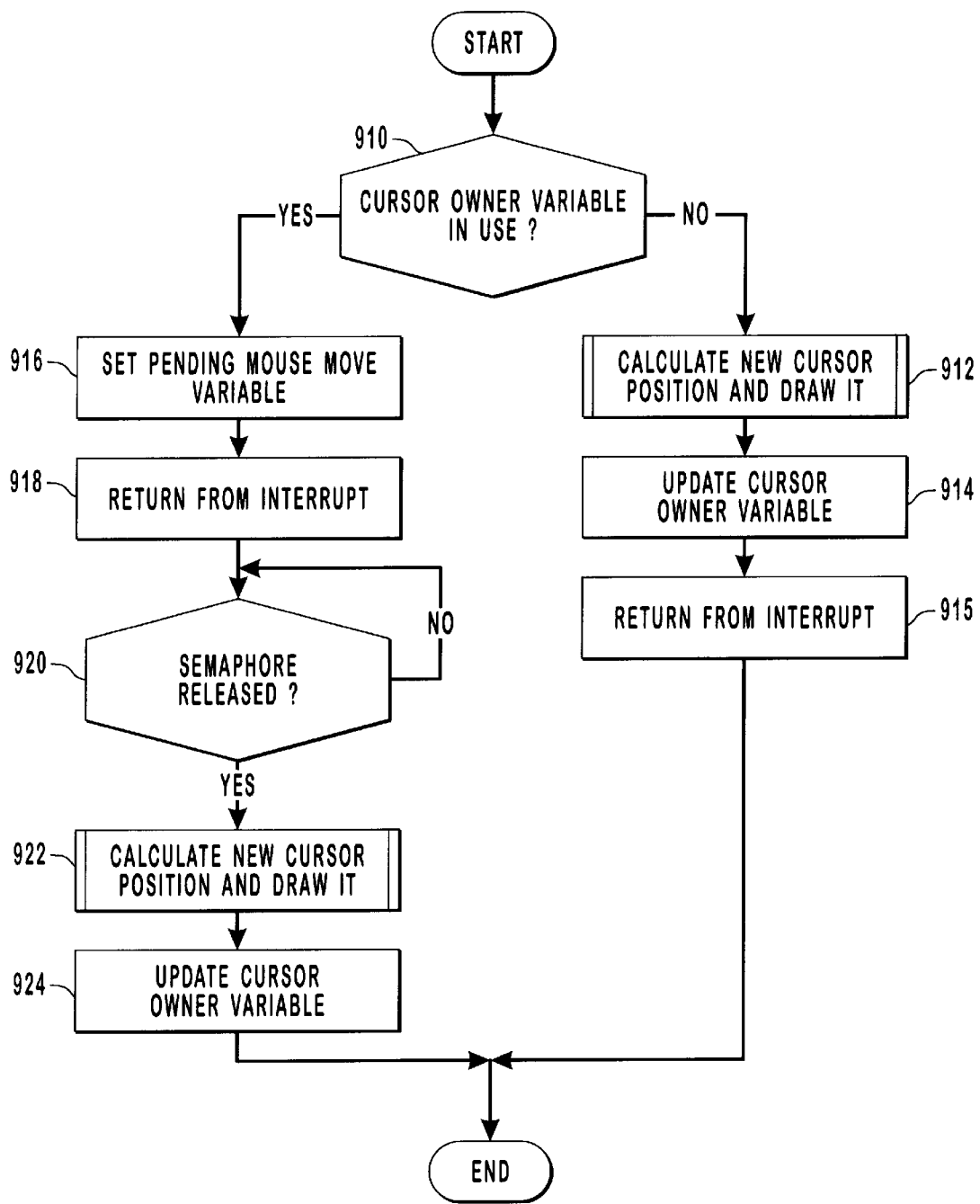
FIG. 10 is a flowchart for setting the cursor owner variable in a multiple monitor environment.

USER avoids this problem by using a "soft" semaphore approach as shown in the flowchart of FIG. 10. When a mouse move event occurs, USER first determines at step 910 whether or not the cursor owner variable is being used by another process (i.e., whether it is semaphore locked). If the cursor owner variable is free, the cursor position is updated at step 912 according to the flowchart of FIG. 9, and the cursor owner variable is updated at step 914 to reflect its current owner. At step 915, the mouse move interrupt routine is terminated and execution returns to the normal application code.

On the other hand, if it is determined at step 910 that the cursor variable is being used, then the cursor image is not moved during this event sequence, but rather a "mouse move pending" variable is set at step 916. This variable indicates that a cursor move ideally should have been performed during the mouse event sequence but was prevented by the locked cursor owner semaphore.

At step 918, the mouse move event sequence terminates and execution returns to the normal application code at which time the process that had the semaphore lock on the cursor owner variable is allowed to complete. USER waits for the semaphore to be released at step 920. Once USER has determined that the semaphore on the cursor owner variable has been released, the cursor image is moved and the cursor owner variable is updated at steps 922 and 924. These steps are substantially the same as steps 912 and 914, described above.

Following each cursor move in FIG. 10, USER must inform the currently active application that a cursor move has occurred. This is accomplished by a "Raw Input Thread" (RIT), which is caused to "wake up" shortly after the termination of each mouse move interrupt routine (steps 915 or 918 in FIG. 10). The RIT sends a message to the active application informing it that the cursor has moved and providing the new location.

Just prior to the RIT's sending the mouse move message to the application, however, any pending mouse moves (as indicated by the mouse move pending variable) are "flushed" (i.e., performed). This step prevents a backlog of pending mouse moves from building up, which might otherwise occur when cursor animation is being used and the end-user has crossed monitor boundaries with the mouse several times in rapid succession. Just as with cursor movement, cursor animation is managed through its own dedicated service routine which is invoked on a periodic basis. Having to frequently service both types of interrupt routines tends to overburden the system and would result in an accumulation of unprocessed mouse moves if they were not flushed at fixed location, for example, during execution of the RIT, as described above.

As noted above, Windows® NT performs the cursor management functions with APCs to a dedicated input handing thread, which may run concurrently with other processes, rather through interrupt service routines, which suspend all other processes. As a result, Windows® NT uses a strict semaphore approach for updating the cursor owner variable without presenting the threat of freezing the operating system.

In order to maintain a robust multiple monitor desktop paradigm, USER also must manage the display of objects other than the cursor. For example, window maximization is a situation that is handled differently by USER depending on whether a single monitor or multiple monitors are being used. In a single monitor environment, an end-user may "maximize" a window by clicking the cursor 25 on a predetermined location on the window, for example, the upper right hand corner. In response, USER enlarges the window so that it occupies the entirety of the monitor space.

Figure 11A:
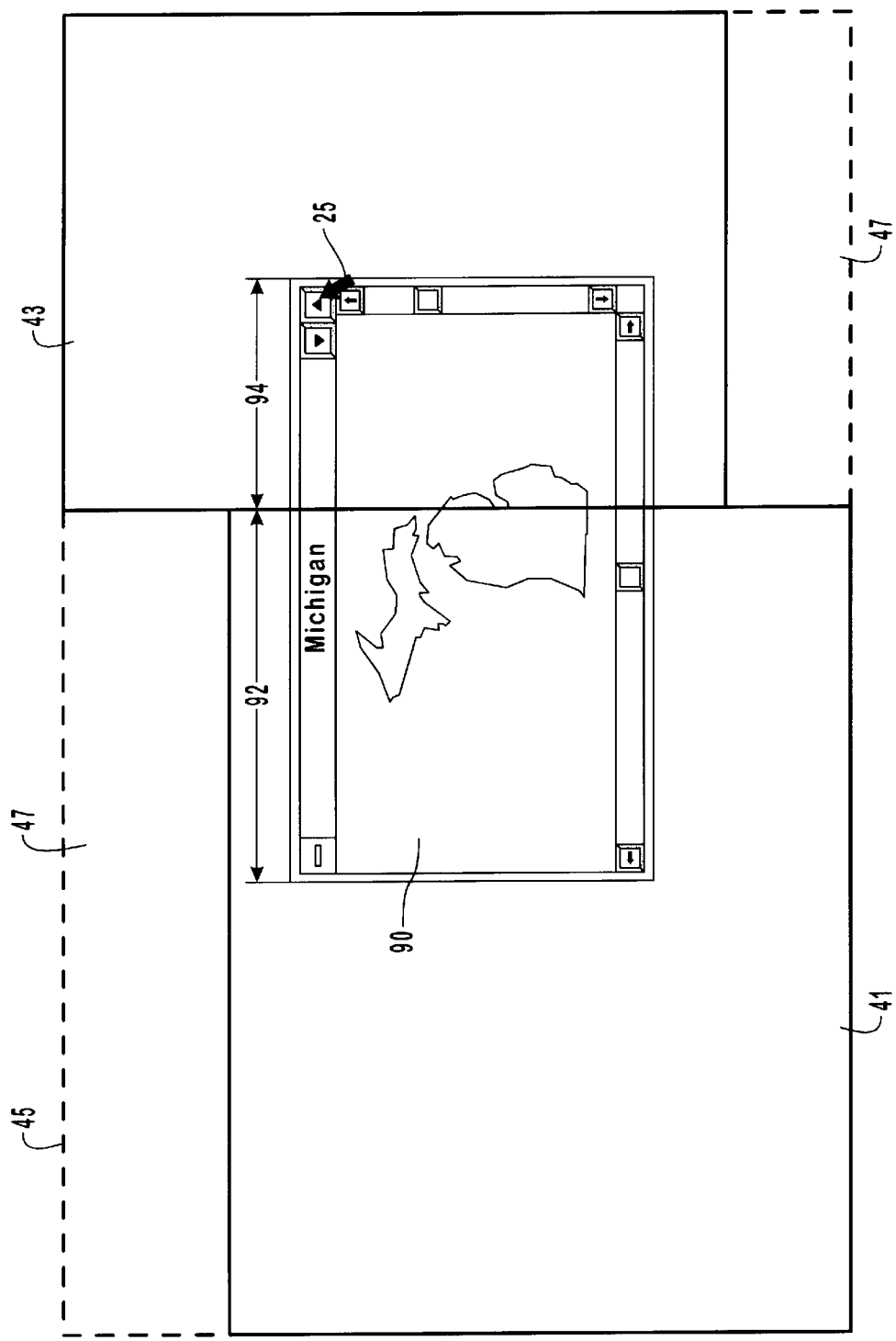
Figure 11B:
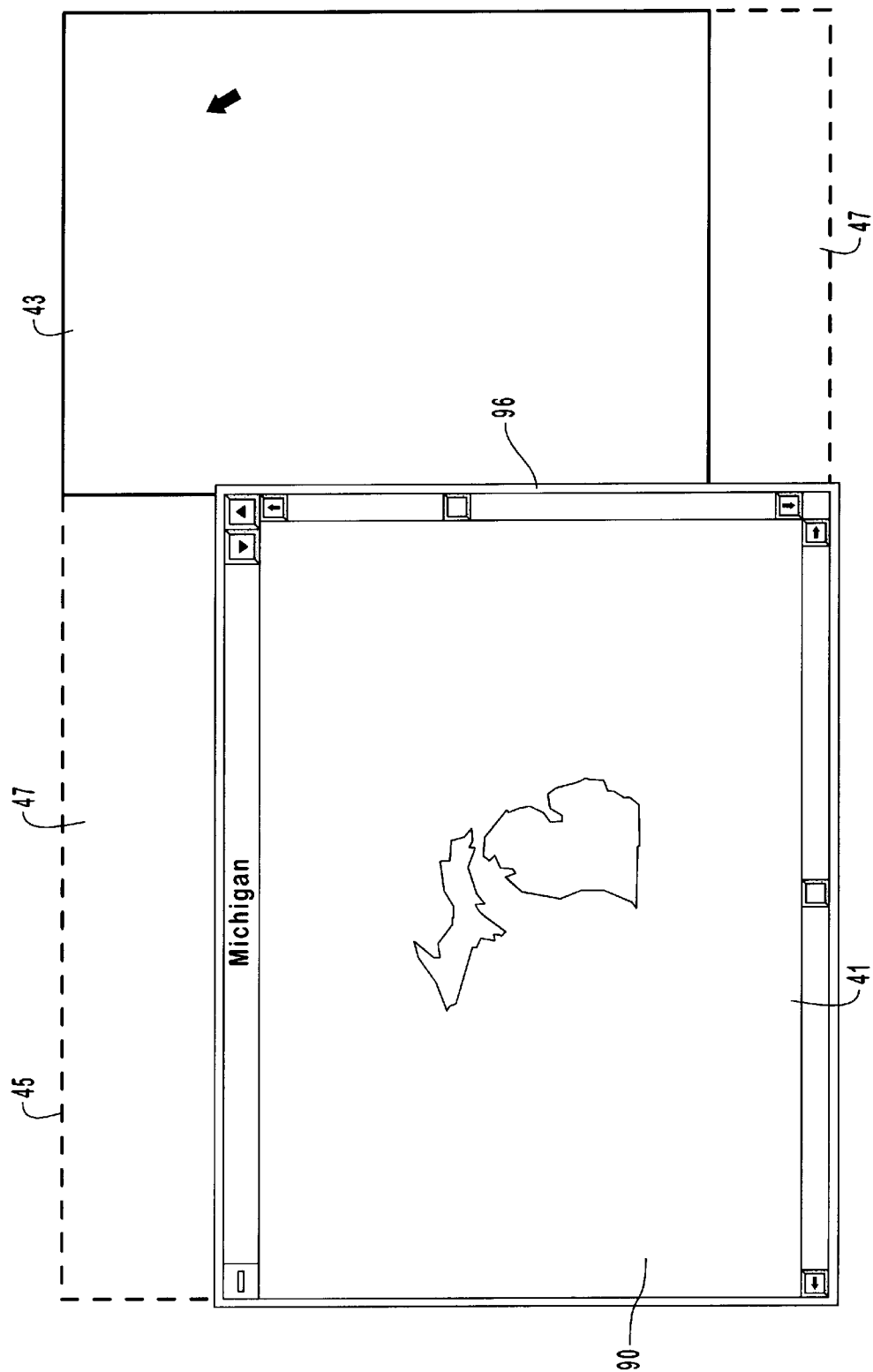

If the single monitor maximization solution were applied in a multiple monitor environment, it would cause the maximized window to be as large as the entire virtual desktop 45. An end-user most likely would regard that arrangement as unhelpful and difficult to view. In addition, some applications would perform erratically, or even fail, if a window was maximized to be as large as a virtual desktop that spanned multiple monitors. To avoid such problems USER determines which one monitor space "owns" the window and maximizes the window only in that monitor space. A monitor space is determined to own a window if a majority of the window's real estate appears in that monitor. In FIG. 11(*a*), window 90 straddles the two monitor spaces 41 and 43 such that the portion 92 in monitor space 41 has a larger area than the portion 94 in monitor space 43. Consequently, as shown in FIG. 11(*b*), when the end-user maximizes window 90 by clicking cursor 25 in the upper right hand corner, window 90 will maximize to occupy monitor space 41.

If a window is to be maximized while it is in a minimized state (e.g., in a Windows®95 system, represented by an icon in an "icon tray" —a rectangular region positioned along one of the borders of the monitor space), the above comparison of respective areas of the icon possessed by each monitor space is not feasible and would produce undesirable results. In that case, USER uses the last non-minimized location and size of the window in determining which monitor space owns the application window.

In practice, a maximized window is enlarged to be slightly bigger than the monitor space so that the window's edges are beyond the monitor's boundaries and thus invisible to the end-user. This increases the available screen real estate. USER handles window borders in a different manner in a multiple monitor environment, however, because the single monitor technique would cause a maximized window's border to appear in the adjacent monitor space. As shown in FIG. 11(*b*), the border 96 of maximized window 90 spills over into, and is visible in, monitor space 43. An end-user would likely regard this phenomenon as confusing and undesirable.

To prevent this occurrence, USER employs the concept of "regional windows" in which one portion of a window is specified to be visible and the remainder of the window is specified to be transparent, both visually (i.e., the background image shows through) and logically (e.g., a mouse click in a window's transparent region will have no effect on the window). In the multiple monitors environment of FIG. 11(c), window 90 is made temporarily regional upon its maximization, with its visible portion corresponding to the inner portion of the window 90 that is coterminous with monitor space 41 and its transparent region corresponding to edges 96, 97, 98 and 99. As a result, the edge 96 that spills over into monitor space 43 upon maximization of window 90 is invisible to the end-user.

Figure 12A:
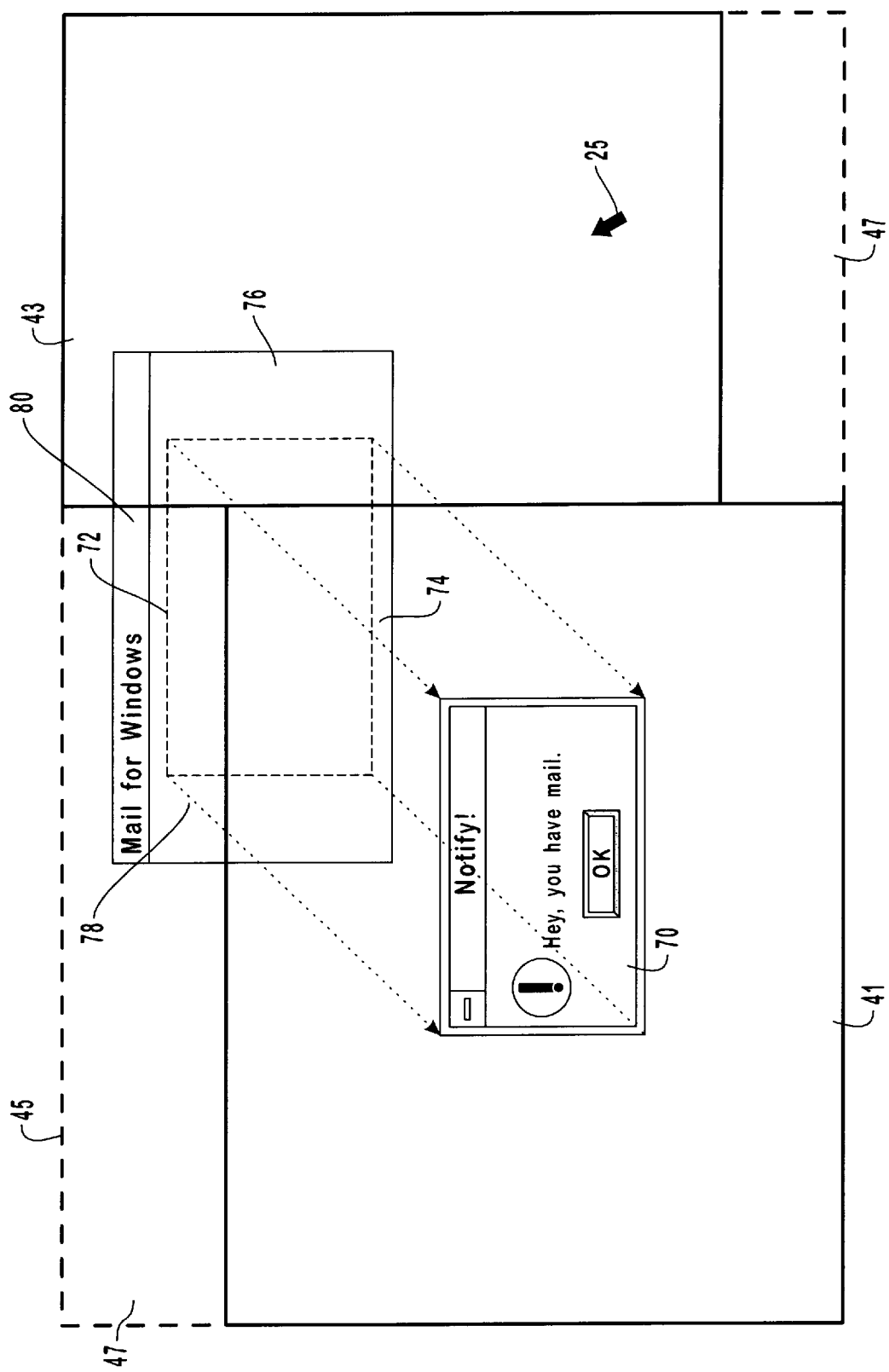
FIGS. 12(a) and 12(b) are example screen displays of positioning a dialog box in a multiple monitors environment.
Figure 12B:
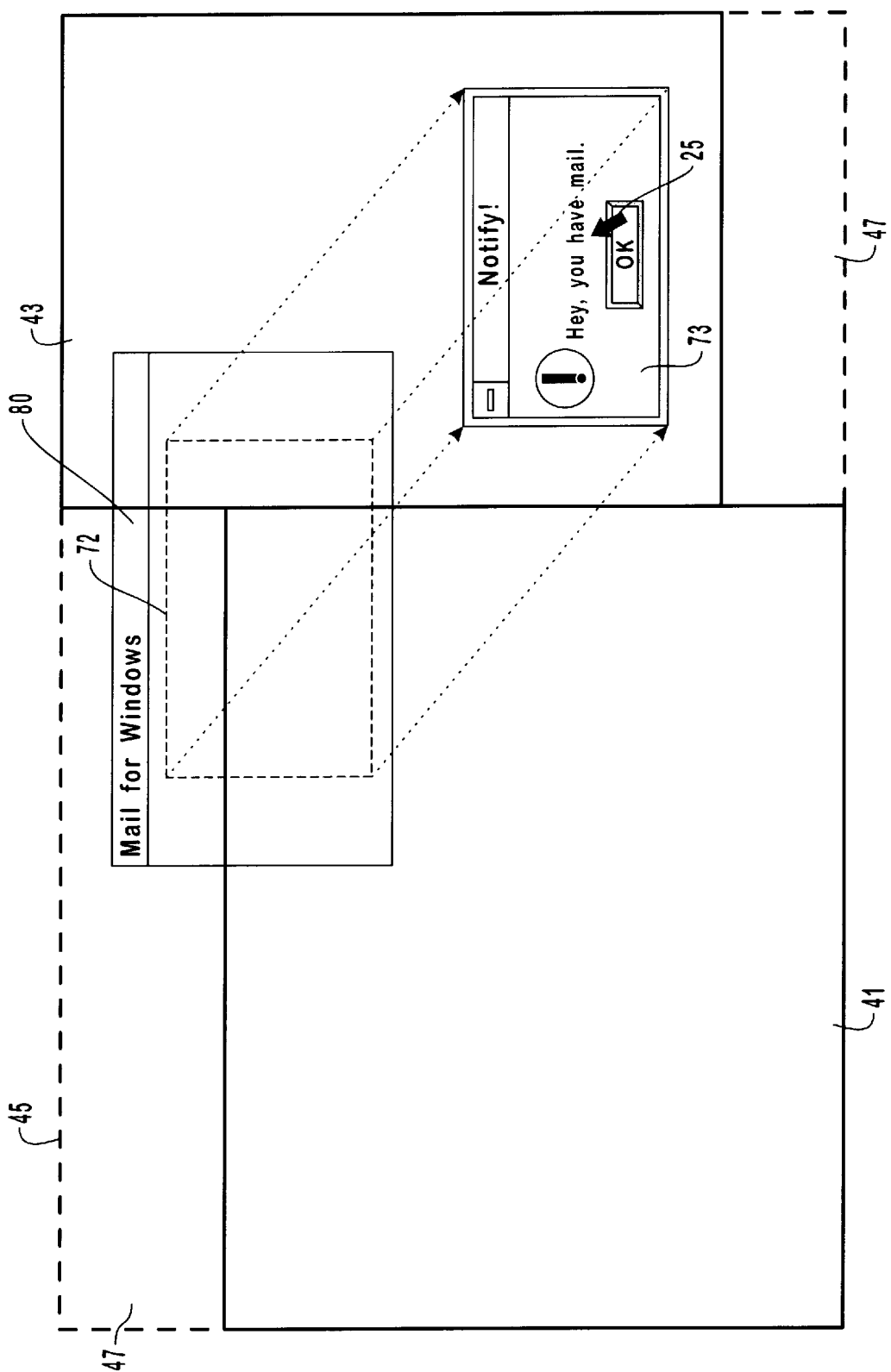

FIGS. 12(a) and 12(b) illustrate another situation in which USER employs a solution in a multiple monitor environment that is different from the corresponding single monitor solution. In this example, a dialog box "Notify!" has been generated by an application in response to an external event—for example, by an electronic messaging application upon receipt of a new e-mail message. Typically, a dialog box conveys potentially important information to the end-user and thus should be readily visible and readable. In a single monitor environment, the USER code will attempt to position a dialog box either (i) to have a common center point with the window of the application that generated the dialog box (if the application window is not minimized); (ii) to have a common center point with the desktop (if the application is minimized or if the dialog box was generated by the operating system rather than by an application); (iii) to have its center point where the cursor is currently positioned, if that feature ("DS_CENTERMOUSE") has been designated by the application; or (iv) at hard-coded device coordinates relative to the top left corner of the window that corresponds to the application that generated the dialog box (or if no such window exists, relative to the top left corner of the desktop).

In the multiple monitor environment of FIGS. 12(a) and 12(b), however, using the single monitor solution frequently would result in the display of a dialog box such that it spans monitor boundaries and spills over either into another monitor space or into a null region. This would make the dialog box difficult to read and understand and is thus undesirable. The USER code avoids this result by ensuring that a dialog box (or any other display region as desired) appears entirely in a single monitor space—namely, in the monitor space that is determined to "own" the application window 80 that generated the dialog box.

In FIG. 12(a), assume that under the single monitor solution, USER would have placed the Notify! dialog box at position 72 such that one portion of the dialog box is displayed in monitor space 41, another portion is displayed in null region 47, and another portion is displayed in monitor space 43. To avoid the poor readability that placement using the single monitor solution would cause, USER instead places the dialog box at position 70—entirely within the one monitor space that owns the dialog box's parent application window 80, "Mail for Windows®." Placement of the dialog box at position 70 allows it to be easily viewed and read by the end-user. Monitor space 41 was determined by USER to own window 80 because it contained a larger portion of window 80 than did monitor space 43. The portion 78 of window 80 that is in null region 47 is ignored by USER for purposes of determining which monitor space owns the application window.

If the DS_CENTERMOUSE feature is being used while in a multiple monitor environment, the dialog box is displayed within the monitor space that owns the cursor. As shown in FIG. 12(b), the dialog box is centered around cursor 25.

If the application window that generated the dialog box is not owned by any monitor space (e.g., the window is in a non-visible region of the desktop or the dialog box was not generated by an application but rather by the operating system), the dialog box is displayed in the center of the monitor space that owns the currently active window. If no window is active, or in any other situation not covered above, the dialog box is displayed in the center of the monitor space corresponding to the "primary display." The primary display is arbitrarily chosen by the operating system at boot-time from among the various monitors that are plugged into the computer system.

If the position of the dialog box is specified by hard-coded device coordinates relative to its parent application window, USER attempts to place the dialog box at the specified position. If the dialog box would cross a monitor boundary, USER clips the dialog box to appear entirely in the monitor space that owns the parent application window. If hard-coded device coordinates are specified but no parent application window exists, USER places the dialog box at the specified coordinates relative to the origin of the monitor that is chosen according to the above criteria (i.e., the monitor that owns the currently active window or the primary monitor).

The USER code has several other features that enhance the robustness of the desktop paradigm from the perspective of an end-user operating in a multiple monitor environment. In the Windows® operating system, an end-user may have several applications running concurrently even though only a single application can be active at a given time. The end-user may alternate between applications, for example, by simultaneously pressing the ALT key and the TAB key. This key combination brings up a "switching" window that lets the end-user switch to (i.e., activate) a different application. When the end-user enters this key combination while in a multiple monitor environment, USER centers the switching window in the monitor space that owns the window of the currently active application. The monitor space so chosen is likely the one on which the end-user's eyes are focused.

Pop-up menus and drop-down lists are handled in a manner similar to dialog boxes in that USER prevents them from spanning monitors. If the pop-up menu that is generated is a "context menu" (generated by a click of the mouse's right button), the pop-up menu is displayed entirely in the monitor space that owns the point at which the cursor was positioned when the click occurred. If the pop-up menu corresponds to a "menu item" (potential choice in menu bar), which is a rectangular display region, the pop-up menu is displayed in the monitor space that owns the menu item. A drop-down list is displayed entirely in the monitor space that owns the display region (e.g., a sunken combo box) that generated the drop-down list.

An end-user may generate a screen dump (e.g., a printed, hard copy of the screen) of the present display by pressing the "PrtScn" key. When the end-user presses the PrtScn key while in a multiple monitor environment, only the monitor space that owns the cursor is dumped to the printer. This choice is based on the assumption that the end-user does not want the entire virtual desktop to be printed. Moreover, it is unlikely that a typical computer system would have sufficient memory capacity to capture an entire desktop that spanned two or more monitors. Lastly, capturing the entire desktop from multiple monitors would produce unattractive results if the overall desktop was non-rectangular or if the various monitors possessed different color characteristics.

In a typical situation, the display of a dialog box or menu or the like is often temporary, with the background image reappearing as soon as the end-user undertakes an action that closes the dialog box or menu. USER takes advantage of the temporary nature of these display regions by caching away the binary data defining the background region that is temporarily obscured by the display region. When the display region closes, it is a simple and quick matter for the GDI to restore the background image by copying the cached binary data to the appropriate locations in the frame buffer. This feature is referred to as "save bits." In a multiple monitors environment, USER does not cache away all of the background image binary data for a display region that spans monitor boundaries. Rather, USER stores away only the binary data corresponding to the portion of the display region that appears in the monitor space that owns the display region. This way, USER does not have to deal with the time-consuming complexity of handling potential differences between the various monitors such as color depths and the like.

In Windows®, the icon tray is ordinarily visible to the end-user along one of the monitors edges unless the end-user has manually removed it from the screen. Some applications (e.g., Microsoft® PowerPoint®) automatically remove the icon tray from the monitor space (i.e., the application goes "full screen") so they have more screen real estate to work with. In a multiple monitor environment, USER displays the icon tray only on one monitor at a time (the primary display as a default or any other display that the end-user so designates). Accordingly, when an application goes full screen when multiple monitors are being used, USER will remove the tray from its monitor space only if the application wants to occupy that same monitor space. If the tray is on a different monitor than the one on which the application has gone full screen, the display of the icon tray remains unaffected.

As shown in FIG. 12(b), a window 80 may be positioned such that a portion of the titlebar (the black strip along the top of the window) is within null region 47 and thus invisible to the end-user. If window 80 was positioned such that titlebar was completely within the null region 47, the end-user would thereafter be unable to reposition the window because to do so requires the end-user to be able to position the cursor over the titlebar. Accordingly, when operating in a multiple monitor environment, USER prevents an end-user from moving a window such that its titlebar is entirely outside any monitor space. Whenever an end-user repositions a window, USER checks each monitor space to see if it contains at least a portion of that window's titlebar. If no monitor space contains any portion of the titlebar, USER automatically repositions the window so that a portion of the titlebar is visible in the monitor space that owns the window.

In order to display an image on a monitor, Windows® must read from memory binary data that defines the image and process it with its graphics engine. This involves numerous calculations and is time-consuming. When an image that is already displayed on a monitor is to be moved to a new position on the monitor, however, that image does not need to be "repainted" (i.e., run through the graphics engine) but rather the pixel data in the frame buffer corresponding to that image simply may be moved from one screen location to another by means of a BitBlt operation, thus saving valuable machine cycles for other processing functions.

In a multiple monitors environment, the various monitors being used may have different color characteristics such as color depth (e.g., 8-bit color versus 16-bit color) or color format (e.g., 5-5-5 16-bit color versus 5-6-5 16-bit color). As a result, binary data that were processed by the graphics engine for display on one monitor, may not be suited for display on a monitor having different characteristics. To do so could produce unattractive results. In a multiple monitors environment accordingly, USER will treat window moves and resizings that span monitor boundaries differently from windows that remain wholly contained in a single monitor space.

Figure 13A:
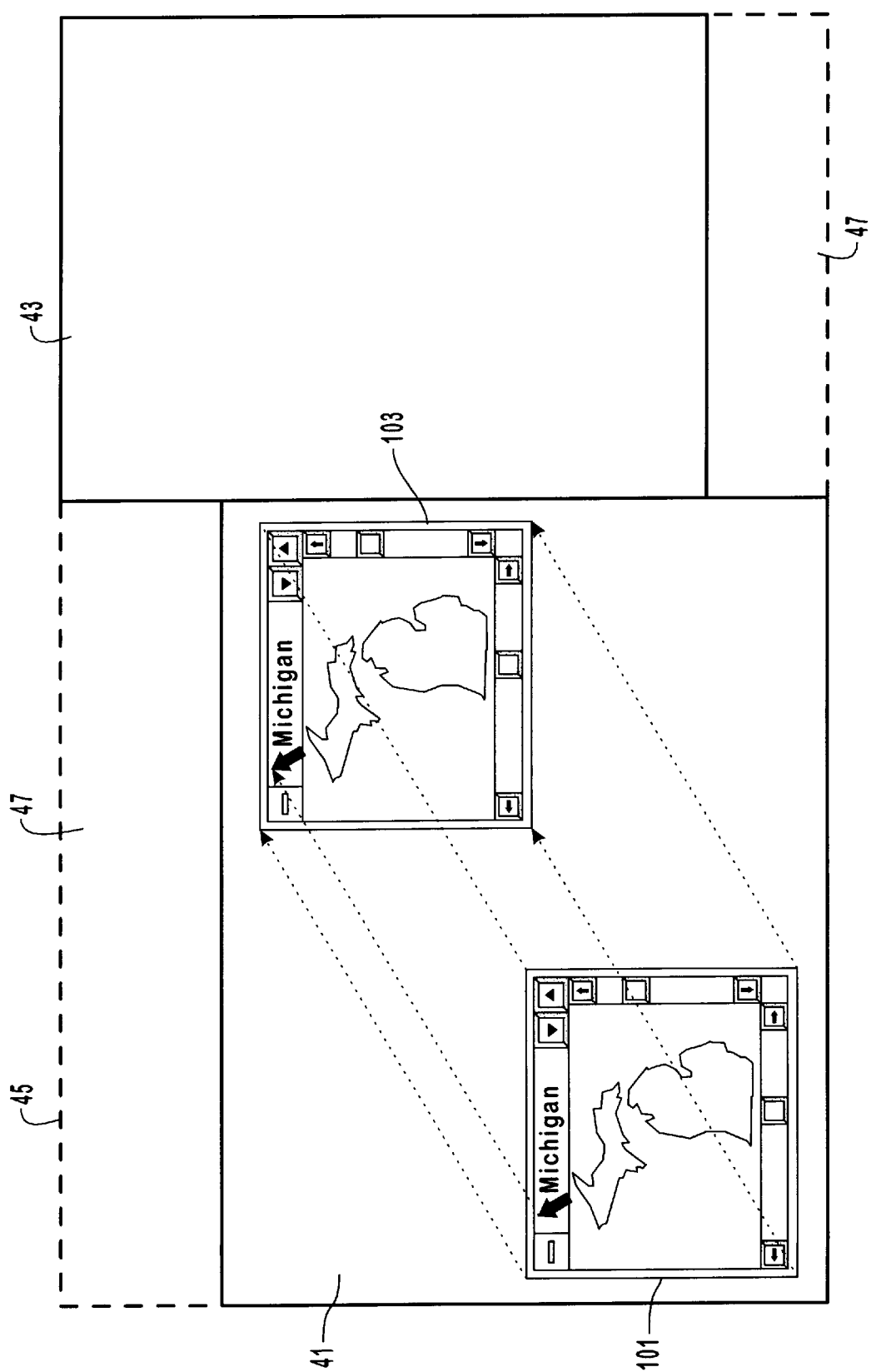
FIGS. 13(a) and 13(b) are example screen displays of positioning a window in a multiple monitors environment.

In the example shown in FIG. 13(a), the end-user has moved the "Michigan" window from position 101 to position 103 such that the window remains entirely within monitor space 41. Consequently, USER can process this window move using the single monitor solution: a BitBlt operation is performed to move the binary data defining the window from a location in the frame buffer corresponding to position 101 to a location corresponding to position 103. If the window had instead been resized, a modified BitBlt occurs in which points are mapped to new space, still without a full repaint.

Figure 13B:
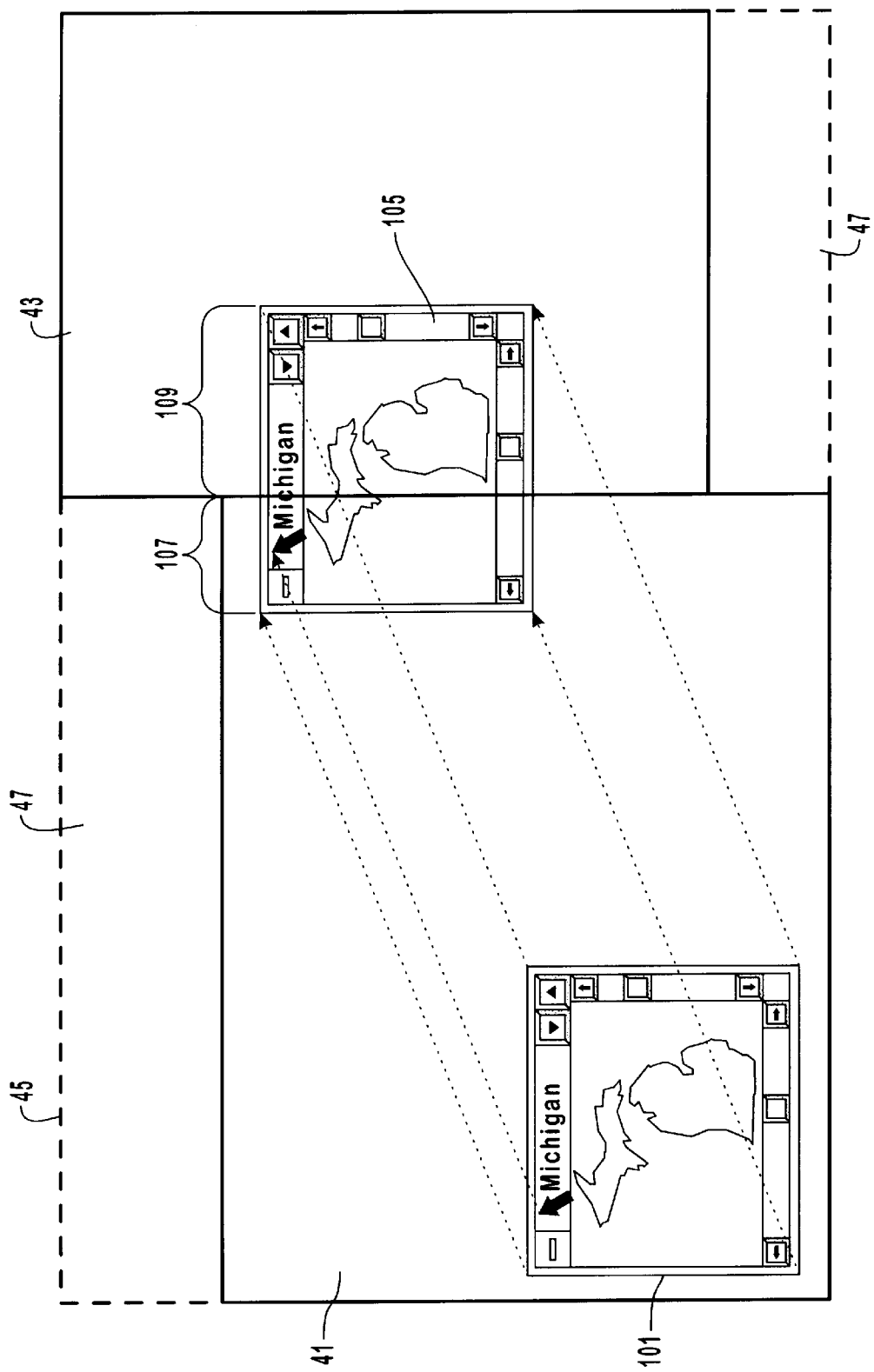

In FIG. 13(b), in contrast, the end-user has moved the Michigan window from position 101 to position 105 such that the window spans the boundary between monitor spaces 41 and 43. Accordingly, if the two monitors have different color characteristics, USER will effect a BitBlt only for the portion 107 of the window that remains in monitor space 41. The portion 109 of the window that is now in monitor space 43 is repainted. This ensures that the two portions of the window will be displayed using pixel data that is tailored to the capabilities of the respective monitors on which the portions appear.

Figure 14:
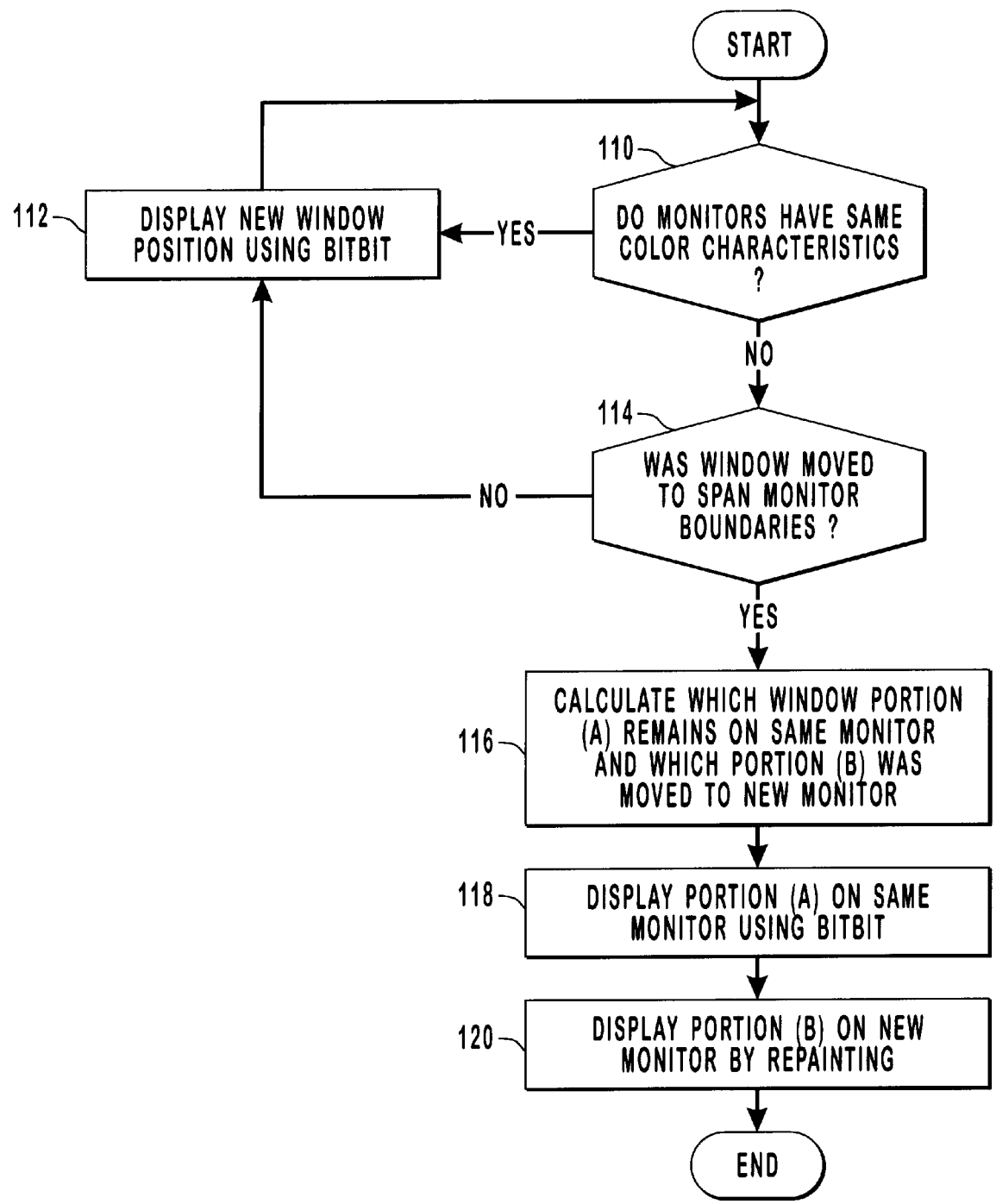
FIG. 14 is a flowchart for painting a window that spans monitors in a multiple monitors environment.

The process by which the above-described transmonitor window moves are accomplished is described in connection with the flowchart of FIG. 14. During boot-time, the operating system determines whether or not the various monitors being used have the same color characteristics, and an operating system variable is set to reflect the outcome of that determination. When an end-user performs a window (or any display region) move while in a multiple monitor environment, at step 110 USER inspects the operating system variable that specifies whether all of the monitors in the environment have the same color characteristics. If they do, then at step 112 all portions of the window may be displayed at its new position using a BitBlt operation without regard to monitor on which the various window portions appear.

On the other hand, if all of the monitors in the environment do not have the same color characteristics, then at step 114 it is determined whether the window was moved to a position that causes it to span the boundary between its original monitor and any other monitor. If the window at its new position does not span window boundaries, then the single monitor solution may be used and the window is displayed at its new position using a BitBlt operation.

If the window at its new position causes it to spill over into a new monitor, then at step 116 USER determines which Portion A remains in the original monitor space and which Portion B now appears in the new monitor space.

At step 118, Portion A is displayed on the original monitor using a BitBlt operation and at step 1220 Portion B is displayed on the new monitor by repainting that portion from scratch. In this manner, USER ensures that portions of windows will be displayed using the proper color characteristics for the respective monitors on which they appear.

Other embodiments are within the scope of the following claims.

What is claimed is:

1. In a computer system that includes (a) an operating system with (i) a graphical user interface (GUI), (ii) a user subsystem which together with the GUI provides for managing a plurality of applications, (iii) a graphical device interface for routing GUI information relating to said applications such as a cursor or an application window for display, (iv) first and second device drivers for receiving GUI information routed from the graphical device interface, and (v) a forking display driver interposed between said user subsystem and said graphical display interface on the one hand, and said first and second device drivers on the other, and (b) at least two monitors each having an actual monitor space which, when connected, combine to define a virtual monitor space for displaying GUI information, a method for allocating the display of graphical user information such as a cursor position or an application window, entirely on only one or the other of the two separate actual monitor spaces, the method comprising the steps of:

dynamically inserting the forking display driver in the event that a second monitor is connected to the system, so that the system does not require re-initialization to use the forking display driver;

comparing a position of the object within said virtual monitor space so as to determine the relationship of said position to each of the actual monitor spaces;

choosing one of the two actual monitor spaces based on the results derived from said comparing step;

displaying the entire object only within the chosen actual monitor space of one of the monitors; and the forking display driver also dynamically removing itself in the event the second monitor is disconnected from the system.

2. In a computer system that includes (a) an operating system with (i) a graphical user interface (GUI), (ii) a user subsystem which together with the GUI provides for managing a plurality of applications, (iii) a graphical device interface for routing GUI information relating to said applications such as a cursor or an application window for display, (iv) first and second device drivers for receiving GUI information routed from the graphical device interface, and (v) a forking display driver interposed between said user subsystem and said graphical display interface on the one hand, and said first and second device drivers on the other, and (b) at least two monitors each having an actual monitor space which is different in size from one another and which, when connected, combine to define a virtual monitor space for displaying GUI information, a method for allocating the display of graphical user information such as a cursor position or an application window, entirely on only one or the other of the two separate actual monitor spaces, the method comprising the steps of:

dynamically inserting the forking display driver in the event that a second monitor is connected to the system, so that the system does not require re-initialization to use the forking display driver;

comparing a position of the object within said virtual monitor space so as to determine the relationship of said position to each of the actual monitor spaces which are different in size, and determining whether the position of the object is at least partially within a null space that results from the different sizes of the monitors;

choosing one of the two actual monitor spaces based on the results derived from said comparing step;

displaying the entire object only within the chosen actual monitor space of one of the monitors; and the forking display driver also dynamically removing itself in the event the second monitor is disconnected from the system.

3. The method of claims 1 or 2 wherein the object comprises a cursor image and wherein the comparing comprises, for each of the actual monitor spaces, determining a closest distance between the position of the cursor image and an edge of the monitor space.

4. The method of claim 3 wherein the choosing comprises selecting a monitor space that is closest to the cursor image.

5. The method of claim 3 wherein the closest distance between the position of the cursor image and an edge of the monitor space is a Euclidean distance.

6. The method or claim 1 or 2 wherein the object comprises a cursor image and wherein the displaying comprises moving the position of the cursor image to a point within the chosen monitor space.

7. The method of claim 6 wherein the point within the chosen monitor space is on an edge of the monitor space.

8. The method of claim 1 or 2 wherein the object comprises a cursor image and wherein the comparing comprises;

establishing a bounding rectangle for the actual monitor spaces by determining their union;

comparing the position of the cursor image with a position of the bounding rectangle; and moving the cursor image's position to a point within the bounding rectangle if the comparing determines that the cursor image was at a position outside of the bounding rectangle.

9. The method of claim 1 or 2 wherein the comparing comprises calculating a squared distance between the position of the object and the positions of each of the actual monitor spaces.

10. The method of claim 9 wherein the choosing comprises selecting a monitor space that has a smallest squared distance between the position of the object and the position of the selected monitor space.

11. The method of claims 1 or 2 wherein the object is a display region and wherein the comparing comprises, for each of the actual monitor spaces, calculating an area of overlap between the display region and the monitor space.

12. The method of claim 11 wherein the choosing comprises selecting a monitor space that has a largest area of overlap with the display region.

13. The method of claim 11 wherein if no monitor space has an area of overlap with the display region, then the choosing comprises selecting a primary display determined at boot-time.

14. The method of claim 11 wherein if no monitor space has an area of overlap with the display region, then the choosing comprises selecting a monitor space corresponding to an active window.

15. The method of claim 11 wherein the displaying comprises moving the position of the display region so that it is substantially contained within the chosen monitor space.

16. The method of claim 11 wherein the display region comprises a pull-down menu.

17. The method of claim 11 wherein the display region is a pop-up menu.

18. The method of claim 11 wherein the display region comprises a dialog box.

19. The method of claim 11 wherein the display region comprises a window.

20. The method of claim 11 wherein the display region comprises a window in a minimized state and wherein the comparing, choosing and displaying occur in response to a request to maximize the display window, whereby the window is maximized in a monitor space that has a largest area of overlap.

21. The method of claim 20 wherein a position of a prior non-minimized state of the window is used in the comparing.

22. The method of claim 1 or 2 wherein the object comprises a window in a minimized state and wherein the comparing, choosing and displaying occur in response to a request to maximize the window.

23. In a computer system that includes (a) an operating system with (i) a graphical user interface (GUI), (ii) a user subsystem which together with the GUI provides for managing a plurality of applications, (iii) a graphical device interface for routing GUI information relating to said applications such as a cursor or an application window for display, (iv) first and second device drivers for receiving GUI information routed from the graphical device interface, and (v) a forking display driver interposed between said user subsystem and said graphical display interface on the one hand, and said first and second device drivers on the other, and (b) at least two monitors each having an actual monitor space which, when connected, combine to define a virtual monitor space for displaying GUI information, a computer program product for implementing on said computer system a method for allocating the display of graphical user information such as a cursor position or an application window, entirely on only one or the other of the two separate actual monitor spaces, the computer program product comprising:

a computer readable medium for carrying computer program code means for implementing said method; and wherein said computer program code means comprises:

computer program code means for dynamically inserting the forking display driver in the event that a second monitor is connected to the system, so that the system does not require re-initialization to use the forking display driver;

computer program code means for comparing a position of the object within said virtual monitor space so as to determine the relationship of said position to each of the actual monitor spaces;

computer program code means for choosing one of the two actual monitor spaces based on the results derived from said comparing step;

computer program code means for displaying the entire object only within the chosen actual monitor space of one of the monitors; and computer program code means dynamically removing the forking display driver in the event the second monitor is disconnected from the system.

24. A computer system for allocating the display of graphical user information (GUI) in the form of an object relating to a plurality of applications running on the computer system, such as a cursor position or an application window, entirely on only one or the other of at least two separate monitor spaces, the computer system comprising:

an operating system that includes a graphical user interface (GUI) and a user subsystem which together provide for managing a plurality of applications, a graphical device interface for routing GUI information relating to said applications such as a cursor or an application window for display on one of the monitors, and first and second device drivers for receiving GUI information routed from the graphical device interface;

at least two monitors, and wherein each monitor includes a monitor space which, when connected, combine to define a virtual monitor space for displaying GUI information; and wherein said operating system comprises a forking display driver interposed between said user subsystem and said graphical display interface on the one hand, and said first and second device drivers on the other, and wherein said forking display driver includes program code means for performing the steps of:

dynamically inserting the forking display driver in the event that a second monitor is connected to the system, so that the system does not require re-initialization to use the forking display driver;

comparing a position of the object within said virtual monitor space so as to determine the relationship of said position to each of the separate monitor spaces;

choosing one of the two monitor spaces based on the results derived from said comparing step;

displaying the entire object only within the chosen monitor space; and dynamically removing the forking display driver in the event the second monitor is disconnected from the system.

25. In a computer system that (a) an operating system with (i) a graphical user interface (GUI), (ii) a user subsystem which together with the GUI provides for managing a plurality of applications, (iii) a graphical device interface for routing GUI information relating to said applications such as a cursor or an application window for display, (iv) first and second device drivers for receiving GUI information routed from the graphical device interface, and (v) a forking display driver interposed between said user subsystem and said graphical display interface on the one hand, and said first and second device drivers on the other, and (b) at least two monitors each having an actual monitor space which is different in size from one another and which, when connected, combine to define a virtual monitor space for displaying GUI information, a computer program product for implementing on said computer system a method for allocating the display of graphical user information such as a cursor position or an application window, entirely on only one or the other of the two separate actual monitor spaces, the computer program product comprising:

a computer readable medium for carrying computer program code means for implementing said method; and wherein said computer program code means comprises:

computer program code means for dynamically inserting the forking display driver in the event that a second monitor is connected to the system, so that the system does not require re-initialization to use the forking display driver;

computer program code means for comparing a position of the object within said virtual monitor space so as to determine the relationship of said position to each of the actual monitor spaces which are different in size, and determining whether the position of the object is at least partially within a null space that results from the different sizes of the monitors;

computer program code means for choosing one of the two actual monitor spaces based on the results derived from said comparing step;

computer program code means for displaying the entire object only within the chosen actual monitor space of one of the monitors; and computer program code means dynamically removing the forking display driver in the event the second monitor is disconnected from the system.

26. A computer system for allocating the display of graphical user information (GUI) in the form of an object relating to a plurality of applications running on the computer system, such as a cursor position or an application window, entirely on only one or the other of at least two separate monitor spaces, the computer system comprising:

an operating system that includes a graphical user interface (GUI) and a user subsystem which together provide for managing a plurality of applications, a graphical device interface for routing GUI information relating to said applications such as a cursor or an application window for display on one of the monitors, and first and second device drivers for receiving GUI information routed from the graphical device interface;

at least two monitors, and wherein each monitor includes a monitor space which is different in size from one another and which, when connected, combine to define a virtual monitor space for displaying GUI information; and wherein said operating system comprises a forking display driver interposed between said user subsystem and said graphical display interface on the one hand, and said first and second device drivers on the other, and wherein said forking display driver includes program code means for performing the steps of:

dynamically inserting the forking display driver in the event that a second monitor is connected to the system, so that the system does not require re-initialization to use the forking display driver;

comparing a position of the object within said virtual monitor space so as to determine the relationship of said position to each of the separate monitor spaces which are different in size, and determining whether the position of the object is at least partially within a null space that results from the different sizes of the monitors;

choosing one of the two monitor spaces based on the results derived from said comparing step;

displaying the entire object only within the chosen monitor space; and dynamically removing the forking display driver in the event the second monitor is disconnected from the system.

* * * * *

UNITED STATES PATENT AND TRADEMARK OFFICE
CERTIFICATE OF CORRECTION

PATENT NO. : 6,018,340
DATED : January 25, 2000
INVENTOR(S) : Laura J. Butler, Adam Smith It is certified that error appears in the above-identified patent and that said Letters Patent is hereby corrected as shown below:

Cover Page, rt. col., ln 42: after "monitors" change "arc" to --are--

Col. 1, ln. 60: after "such" and before "windows" insert --as--

Col. 4, ln. 45: after "multiple" change "monitors" to --monitor--

Col. 4, ln. 48: after "multiple" change "monitors" to --monitor--

Col. 4, ln. 50: after "multiple" change "monitors" to --monitor--

Col. 4, ln. 52: after "multiple" change "monitors" to --monitor--

Col. 6, ln. 34: after "can call" change "a" to --an--

Col. 12, ln. 8: after "at" and before "fixed" insert --a--

Col. 12, ln. 12: before "thread" change "handing" to --handling--

Col. 18, ln. 14: after "method" change "or" to --of--

Col. 19, ln. 11: after "system that" and before "(a) and" delete [includes]

Signed and Sealed this

Sixth Day of March, 2001

Attest:

NICHOLAS P. GODICI

*Attesting Officer*   *Acting Director of the United States Patent and Trademark Office*